United States Patent
Lopez et al.

(10) Patent No.: US 9,172,449 B2
(45) Date of Patent: Oct. 27, 2015

(54) PRECODING FOR MIMO

(71) Applicant: Telefonaktiebolaget L M Ericsson (publ), Stockholm (SE)

(72) Inventors: Miguel Lopez, Solna (SE); Eric Nordström, Stockholm (SE); Henrik Sahlin, Mölnlycke (SE); Mårten Sundberg, Årsta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 182 days.

(21) Appl. No.: 13/997,877

(22) PCT Filed: Jun. 14, 2013

(86) PCT No.: PCT/SE2013/050697
§ 371 (c)(1),
(2) Date: Jun. 25, 2013

(87) PCT Pub. No.: WO2014/031057
PCT Pub. Date: Feb. 27, 2014

(65) Prior Publication Data
US 2014/0079041 A1     Mar. 20, 2014

Related U.S. Application Data

(60) Provisional application No. 61/691,444, filed on Aug. 21, 2012.

(51) Int. Cl.
*H04B 7/212* (2006.01)
*H04B 7/04* (2006.01)
(Continued)

(52) U.S. Cl.
CPC ............ *H04B 7/0473* (2013.01); *H04B 7/0456* (2013.01); *H04B 7/0639* (2013.01); *H04B 7/0684* (2013.01); *H04B 7/2656* (2013.01); *H04B 7/0486* (2013.01); *H04B 7/0851* (2013.01)

(58) Field of Classification Search
USPC ......... 370/337, 527, 529, 336, 345, 347, 349, 370/528; 375/295, 305, 341, 231, 232, 262, 375/274, 299
See application file for complete search history.

(56) References Cited

U.S. PATENT DOCUMENTS 5,881,363 A * 3/1999 Ghosh et al. .................. 725/125
8,681,731 B2 * 3/2014 Kreuzer et al. ............... 370/330
(Continued)

OTHER PUBLICATIONS

Dahlman, E. et al. 4G LTE/LTE-Advanced for Mobile Broadband. Elsevier Ltd., 2011, pp. 165-170.
Plicanic, V. et al. "Performance of Handheld MIMO Terminals in Noise- and Interference-Limited Urban Macrocellular Scenarios." IEEE Transactions on Antennas and Propagation, vol. 60, No. 8, Aug. 2012.
(Continued)

*Primary Examiner* — Chi H Pham
*Assistant Examiner* — Alexander O Boakye
(74) *Attorney, Agent, or Firm* — Patent Portfolio Builders, PLLC

(57) ABSTRACT

The embodiments herein relate to a method in a transmitter (101) for transmitting at least a first data burst and a second data burst to a receiver (105) in a system (100) applying applies closed loop codebook-based precoding MIMO. The transmitter (101) comprises at least a first Tx antenna (107a) and a second Tx antenna (107b). The transmitter (101) transmits, to the receiver (105), at least the first data burst through the first Tx antenna (107a) and the second data burst through the second Tx antenna (107b). The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

42 Claims, 19 Drawing Sheets

(51) Int. Cl.
*H04B 7/06* (2006.01)
*H04B 7/26* (2006.01)
*H04B 7/08* (2006.01)

(56) References Cited

U.S. PATENT DOCUMENTS

2005/0180360 A1  8/2005  Hansen et al.
2005/0249305 A1  11/2005  Ponnampalam et al.
2011/0135023 A1  6/2011  Kwon et al.
2012/0120997 A1  5/2012  Park et al.

OTHER PUBLICATIONS

3rd Generation Partnership Project. "MIMO Concepts for EGPRS." 3GPP TSG GERAN #54, GP-120762, Sanya, P.R. China, May 14-18, 2012.
3rd Generation Partnership Project. 3GPP TS 45.002, V11.2.0 (Mar. 2013). 3rd Generation Partnership Project; Technical Specification Group GSM/EDGE Radio Access Network; Multiplexing and multiple access on the radio path (Release 11). Mar. 2013.

* cited by examiner

PRECODING FOR MIMO

TECHNICAL FIELD

Embodiments herein relate generally to a transmitter, a method in the transmitter, a receiver and a method in the receiver. More particularly the embodiments herein relate to handling data bursts transmitted from the transmitter to the receiver in a system applying closed loop codebook-based precoding Multiple Input Multiple Output (MIMO).

BACKGROUND

A communications system may be based on one or more communication technologies, such as e.g. Global System for Mobil Communications (GSM), Long Term Evolution (LTE), General Packet Radio Service (GPRS), Enhanced GPRS/Enhanced Data rates for GSM Evolution (EGPRS/EDGE) etc. EGPRS/EDGE is an enhancement of a GSM network in which EDGE is introduced on top of the GPRS that is used to transfer data in a packet switched mode on several time slots. EGPRS2 is a phase 2 of the EGPRS, i.e. a further development of EPGRS.

The enhancement of GSM and EDGE in order to provide support for MIMO has been proposed in several occasions. A two layer transmission is already supported in GSM, in a feature called Voice services over Adaptive Multi-user channels on One Slot (VAMOS). The simulation results of the enhancements with VAMOS are intriguing and suggest that MIMO for EGPRS/EGRPS2 should be given careful consideration. As known for a skilled person is the use of multiple antennas at both the transmitter and receiver in order to improve communication performance.

In the context of MIMO (either single user MIMO or multi-user MIMO) a layer refers to a data stream (this is the MI part in MIMO). These data streams are the Multiple Input. This means that the term "two or more layers" refers to "two or more data streams" and these data streams are different.

One enhancement presents a straightforward implementation of MIMO for EGPRS that is to a large extent backwards compatible with the GSM and EDGE air interface. Each layer is independently coded and modulated according to an EGPRS modulation and coding scheme. Each layer is assigned a different training sequence. The standardized VAMOS training sequence pairs are proposed (after a straightforward mapping of the training bit sequence to antipodal 8 Phase Shift Keying (PSK) symbols). Thus, the transmitter comprises two parallel EGPRS transmitters, each fed its own data stream and training sequence. PSK is a digital modulation scheme that conveys data by changing, or modulating, the phase of a reference signal (the carrier wave).

Beamforming is a signal processing technique where radio signals transmitted over an air-interface are combined by multiple transmit antennas in such a way that the electromagnetic waves transmitted or received at some angles experience constructive interference while the electromagnetic waves transmitted or received at other angles experience destructive interference. The technique may be used at both the transmitting and receiving ends in order to achieve spatial selectivity. More generally, modern beamforming techniques are based on the principle that when both the transmitter and receiver have knowledge of the propagation channel, the weight for each transmit antenna may be adapted so that the Signal to Noise Ratio (SNR) at the receiver is improved. When the weights affect only the polarization of the transmitted radio wave, beamforming cannot be interpreted as forming a physical beam and may not yield spatial selectivity.

In spatial multiplexing, multiple data streams are transmitted from different transmit antennas but in the same frequency channel. If the propagation channel has a sufficient number of degrees of freedom (i.e. the rank of the channel matrix is large enough), the receiver may separate these streams into (almost) orthogonal channels.

Codebook Based Precoding

The codebook based precoding is a technology used in e.g. LTE which fixes a common codebook comprising a set of vectors and matrices known apriori to both the transmitter and the receiver. The vectors and matrices may also be referred to as codewords. In other words, a finite set of precoding matrices is called a codebook. Each precoding matrix in the codebook is associated with an index. In a closed-loop codebook based precoding transmission, the receiver transmits, to a transmitter, the index of a precoding matrix from a pre-designed codebook.

Closed Loop MIMO in LTE

Closed loop MIMO technologies have been standardized in LTE. LTE requires the calculation of three feedback quantities at the receiver, namely, Channel Quality Indicator (CQI), Precoding Matrix Indicator (PMI) and Rank Indicator (RI), in order to perform channel adaptation at the transmitter. The CQI is used to select a modulation and coding scheme. The PMI is used to select the codebook index. The RI indicates the preferred number of layers. Since the coherence time of the radio channel is in the order of a few ms, LTE has been designed to support fast feedback. One aim of closed loop spatial multiplexing transmission modes in LTE is to adapt the transmission to the current (instantaneous) channel conditions. Channel state information just a few sub-frames old (1 sub-frame has duration of 1 ms) may be already obsolete. The periodicity of the feedback loop is in the order of a few ms.

Reconfigurable Multiple Antennas in the Receiver

Recent measurement campaigns on MIMO channels have revealed the potential benefits in capacity performance that may be obtained by adapting the antenna configuration at the receiver. The results show that choosing the best among three possible antenna configurations at the receiver along 20 m route sections, leads to significant gains. The speed of the receiver did not exceed 30 km/h, and the frequency band was 2.65 GHz. This means that the best antenna configuration was kept fixed during time intervals of 2.4 s or longer. It is reasonable to expect that when the measurements had been performed in the 900 MHz band, the same gains would have been obtained by keeping the antenna configuration fixed during time intervals longer than 2.4 s, perhaps up to 7 s.

Spectrum and power efficiencies are of paramount importance in wireless communications. Therefore, it is desirable to implement closed loop MIMO techniques for MIMO in EGPRS/EGPRS2. Moreover, when MIMO for EGPRS/EGPRS2 is to be standardized and deployed, it is important to ensure that it is designed to maximize the link performance, while maintaining, to a large extent, backwards compatibility with the GSM air interface.

Closed loop techniques such as those used in LTE and other wireless technologies are very promising, but cannot be applied to an enhancement of EGPRS/EGPRS2 with MIMO, because the GSM air interface does not support the low latency required by the fast feedback channels. In other words, the gains brought about by the closed loop MIMO techniques standardized in LTE cannot be achieved in a MIMO EGPRS/EGPRS2 system. Moreover, in LTE the transmission antennas in the base station broadcast cell specific reference signals which are essential for the receiver in order to compute the CQI, PMI and RI. Such signals are not available in the current GSM/EDGE air interface.

SUMMARY

An objective of embodiments herein is therefore to obviate at least one of the above disadvantages and to provide improved MIMO EGPRS/EGPRS2 transmission in a communications system.

According to a first aspect, the object is achieved by a method in a receiver for receiving at least a first data burst and a second data burst from a transmitter in a system. The system is an EGPRS/EGRPS2 system. The system applies closed loop codebook-based precoding MIMO. The receiver comprises at least two receiver (Rx) antennas. The receiver receives, from the transmitter, the first data burst and the second data burst through each of the at least two Rx antennas. The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

According to a second aspect, the object is achieved by method in a transmitter for transmitting at least a first data burst and a second data burst to a receiver in a system. The system is an EGPRS/EGRPS2 system. The system applies closed loop codebook-based precoding MIMO. The transmitter comprises at least a first transmission (Tx) antenna and a second Tx antenna. The transmitter transmits, to the receiver, the first data burst through the first Tx antenna and the second data burst through the second Tx antenna. The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

According to a third aspect, the object is achieved by receiver for receiving at least a first data burst and a second data burst from a transmitter in a system. The system is an EGPRS/EGRPS2 system. The system applies closed loop codebook-based precoding MIMO. The receiver comprises at least two receiver Rx antennas. The receiver is configured to receive, from the transmitter, the at least first data burst and the second data burst through each of the at least two Rx antennas. The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

According to a fourth aspect, the object is achieved by a transmitter for transmitting at least a first data burst and a second data burst to a receiver in a system. The system is an EGPRS/EGRPS2 system. The system applies closed loop codebook-based precoding MIMO. The transmitter comprises at least a first Tx antenna and a second Tx antenna. The transmitter is configured to transmit, to the receiver, the first data burst through the first Tx antenna and the second data burst through the second Tx antenna. The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

The embodiments herein introduce a closed loop MIMO concept for EGPRS/EGPRS2. Unlike LTE, it does not rely on fast feedback. It exploits the fact for a given data transmission, there may be preferred phases/amplitudes of the transmitted signals that give gains over fixed or random phases, over time periods much larger than the coherence time of the channel. Since the time periods over which the phases/amplitudes are kept constant are of the order of a few seconds, the latency of EGPRS/EGPRS2 does not prevent the receiver to provide useful feedback to the transmitter.

The characteristics of the radio channel between the transmitter and the receiver may be modified from data burst to data burst by using different precoding matrices. Codebook based precoding, similar to that used in LTE, is employed in the embodiments herein. Not all data bursts are precoded. At the receiver side, the receiver blindly detects the use of precoding by detecting the rotation of the training sequences. Some rotations are used for precoded data bursts and a different set of rotations are used for non-precoded data bursts. Alternatively, the Time division multiple access (TDMA) frame numbers when precoding is used/not used are signaled by the transmitter (that is, by the network in DownLink (DL) transmissions) to the receiver. When a data burst is not precoded, the receiver may estimate the preferred precoding matrix among the finite set of precoding matrices in the codebook. The preferred precoding matrix may also be referred to as a best precoding matrix. The precoding matrix may be referred to as a precoder, for the sake of simplicity. The receiver feeds back long term statistics of the estimated precoder to the transmitter, in a way compatible with existing mechanisms for feedback in GSM.

Embodiments herein afford many advantages, of which a non-exhaustive list of examples follows:

An advantage of the embodiments herein is that they enhance a MIMO EGPRS/EGPRS2 system providing better link performance and increasing the spectrum efficiency.

Moreover, another advantage of the embodiments here is that they are to a large extent backwards compatible with the GSM/EDGE air interface. No new fast feedback channels or cell specific reference signals are needed.

A further advantage of the embodiments herein is that they improve the spectrum efficiency of the system and lowers the energy consumption at the transmitter side.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
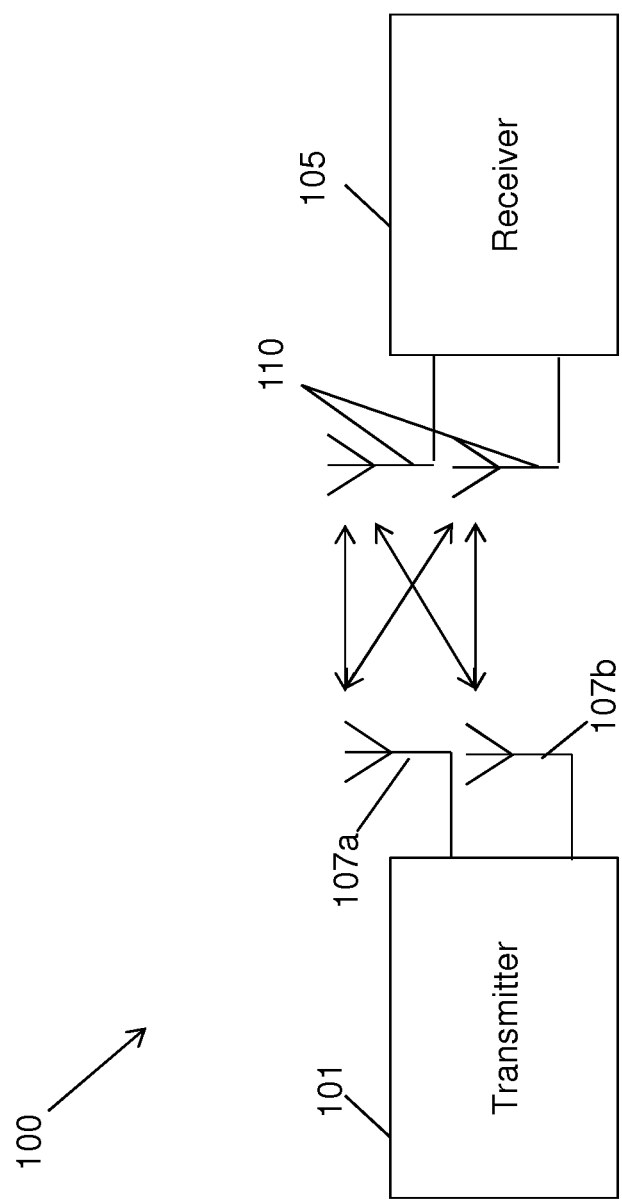
FIG. 1 is a schematic block diagram illustrating embodiments of a communications system.

FIG. 1 depicts a system 100 in which embodiments herein may be implemented. The system 100 may in some embodiments apply to one or more radio access technologies such as for example GSM or EDGE/EPGRS or EGPRS/EGRPS2, or any other suitable radio access technology.

The system 100 comprises a transmitter 101 configured to communicate with a receiver 105. The transmitter 101 comprises at least two transmitter (Tx) antennas, i.e. a first Tx antenna 107*a* and a second Tx antenna 107*b*, each configured to transmit for example data bursts. The receiver 105 comprises at least two receiver (Rx) antennas 110 configured to receive for example data bursts from the transmitter 101.

In some embodiments, the transmitter 101 is represented by a base station such as a NodeB, an evolved NodeB (eNB), or any other network unit capable to communicate over with the receiver 105. The transmitter 101 may be comprised in the base station or connected to and located in the proximity of the base station. In some embodiments, the transmitter 101 is represented by a user equipment, which may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. The transmitter 101 may be comprised in the user equipment or connected to and located in the proximity of the user equipment.

In some embodiments, the receiver 105 is represented by a base station such as a NodeB, an evolved NodeB (eNB), or any other network unit capable to communicate over with the transmitter 101. The receiver 105 may be comprised in the base station or connected to and located in the proximity of the base station. In some embodiments, the receiver 105 is represented by a user equipment, which may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. The receiver 105 may be comprised in the user equipment or connected to and located in the proximity of the user equipment.

It should be noted that the communication link between the transmitter 101 and the receiver 105 may be of any suitable kind comprising either a wired or wireless link. The link may use any suitable protocol depending on type and level of layer (e.g. as indicated by the OSI model) as understood by the person skilled in the art.

Figure 2:
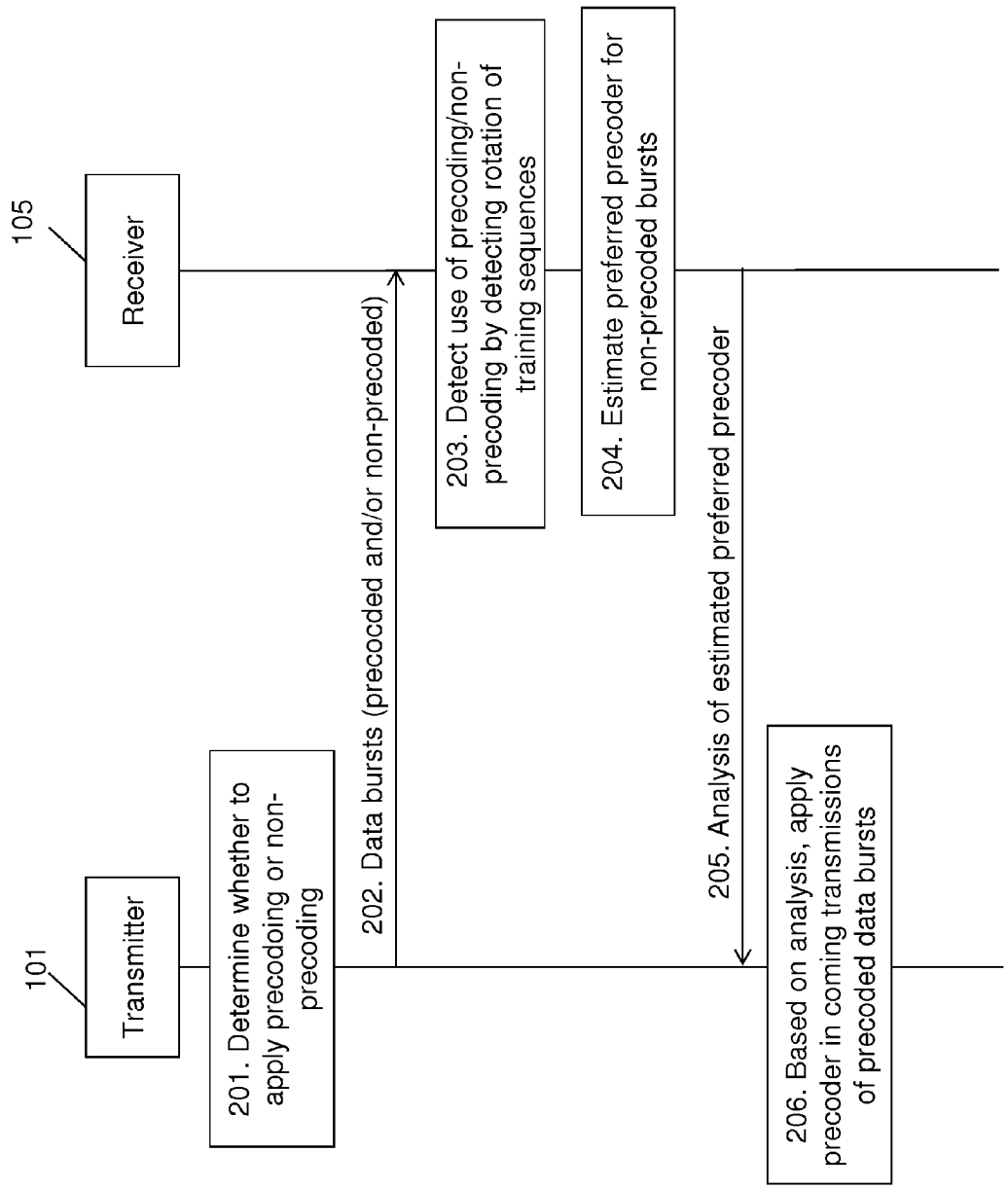
FIG. 2 is a signaling diagram illustrating embodiments of a method in a communications system.

The method for handling data bursts transmitted from the transmitter 101 to the receiver 105, according to some embodiments will now be described with reference to the signalling diagram depicted in FIG. 2. FIG. 2 shows the general steps of the method. More detailed steps are described further below with reference to FIGS. 9-13. The method comprises the following steps, which steps may as well be carried out in another suitable order than described below:

Step 201

When the transmitter 101 comprises data bursts to be transmitted to the receiver 105, it determines whether it should apply precoding or non-precoding to each data burst.

Step 202

The transmitter 101 transmits the data bursts to the receiver 105. The data bursts are precoded and/or non-precoded.

Step 203

The receiver 105 receives data bursts and detects the use of precoding and/or non-precoding by detecting rotation of training sequences applied to the data bursts.

Step 204

When the receiver 105 has detected data bursts which are non-precoded, it estimates a preferred precoder for those non-precoded data bursts.

Step 205

The receiver 105 performs an analysis of the estimated preferred precoder and transmits information regarding the analysis to the transmitter 101.

Step 206

The transmitter 101 receives the analysis from step 205 and applies a precoder based on the received analysis for coming transmissions of precoded data bursts.

A more detailed description of the steps 201-206 in FIG. 2 will now be described.

There may be several physical antenna configurations at the receiver 105. The effect of switching the Rx antenna 110 may be partially obtained by keeping the Rx antenna 110 fixed and changing the phases and/or amplitudes of the signals at the transmitter 101. One convenient way to do this is by applying codebook based precoding at the transmitter 101, in a fashion similar to LTE. However, unlike LTE, there are no cell specific reference signals in GSM/EDGE. Instead, the usual training sequences play the additional role of reference signals for precoder estimation.

A training sequence may be a sequence of bits that is known at both the transmitter 101 and the receiver 105. The third Generation Partnership Project (3GPP) defines the "training sequence bits" as modulating bits with states as given in the following table 1 according to the Training Sequence Code (TSC).

TABLE 1

| Training Sequence Code (TSC) | Training sequence symbols (Bit Number 183, Bit Number 184 ... Bit Number 260) |
|---|---|
| 0 | (1, 1, 1; 1, 1, 1; 0, 0, 1; 1, 1, 1; 1, 1, 1; 0, 0, 1; 1, 1, 1; 0, 0, 1; 0, 0, 1; 0, 0, 1; 1, 1, 1; 1, 1, 1; 1, 1, 1; 1, 1, 1; 0, 0, 1; 1, 1, 1; 1, 1, 1; 1, 1, 1; 0, 0, 1; 1, 1, 1; 1, 1, 1; 0, 0, 1; 1, 1, 1; 0, 0, 1; 0, 0, 1; 0, 0, 1) |
| 1 | (1, 1, 1; 1, 1, 1; 0, 0, 1; 1, 1, 1; 0, 0, 1; 0, 0, 1; 1, 1, 1; 0, 0, 1; 0, 0, 1; 0, 0, 1; 1, 1, 1; 0, 0, 1; 0, 0, 1; 0, 0, 1; 1, 1, 1; 1, 1, 1; 1, 1, 1; 0, 0, 1; 1, 1, 1; 0, 0, 1; 0, 0, 1; 1, 1, 1; 0, 0, 1; 0, 0, 1; 0, 0, 1) |
| 2 | (1, 1, 1; 0, 0, 1; 1, 1, 1; 1, 1, 1; 1, 1, 1; 1, 1, 1; 0, 0, 1; 0, 0, 1; 0, 0, 1; 1, 1, 1; 0, 0, 1; 0, 0, 1; 0, 0, 1; 1, 1, 1; 1, 1, 1; 1, 1, 1; 0, 0, 1; 1, 1, 1; 1, 1, 1; 1, 1, 1; 1, 1, 1; 1, 1, 1; 1, 1, 1; 0, 0, 1; 0, 0, 1; 0, 0, 1; 1, 1, 1) |
| 3 | (1, 1, 1; 0, 0, 1; 1, 1, 1; 1, 1, 1; 1, 1, 1; 0, 0, 1; 0, 0, 1; 0, 0, 1; 0, 0, 1; 0, 0, 1; 1, 1, 1; 0, 0, 1; 1, 1, 1; 0, 0, 1; 1, 1, 1; 1, 1, 1; 1, 1, 1; 1, 1, 1; 0, 0, 1; 1, 1, 1; 1, 1, 1; 0, 0, 1; 0, 0, 1; 0, 0, 1; 1, 1, 1) |
| 4 | (1, 1, 1; 1, 1, 1; 1, 1, 1; 0, 0, 1; 0, 0, 1; 1, 1, 1; 0, 0, 1; 1, 1, 1; 1, 1, 1; 0, 0, 1; 0, 0, 1; 0, 0, 1; 1, 1, 1, 1; 1, 1, 1; 0, 0, 1; 1, 1, 1; 1, 1, 1; 1, 1, 1; 1, 1, 1; 1, 1, 1; 0, 0, 1; 0, 0, 1; 1, 1, 1; 0, 0, 1; 1, 1, 1; 0, 0, 1) |
| 5 | (1, 1, 1; 0, 0, 1; 1, 1, 1; 1, 1, 1; 0, 0, 1; 0, 0, 1; 0, 0, 1; 1, 1, 1; 0, 0, 1; 1, 1, 1; 1, 1, 1; 0, 0, 1; 0, 1, 1, 1; 1, 1, 1; 1, 1, 1; 1, 1, 1; 1, 1, 1; 0, 0, 1; 1, 1, 1; 1, 1, 1; 1, 1, 1; 0, 0, 1; 0, 0, 1; 0, 0, 1; 1, 1, 1; 0, 0, 1; 1, 1, 1) |
| 6 | (0, 0, 1; 1, 1, 1; 0, 0, 1; 1, 1, 1; 1, 1, 1; 0, 0, 1; 0, 0, 1; 0, 0, 1; 0, 0, 1; 0, 0, 1; 0, 0, 1; 1, 1, 1; 0, 0, 1; 0, 0, 1; 1, 1, 1; 1, 1, 1; 1, 1, 1; 0, 0, 1; 1, 1, 1; 1, 1, 1; 0, 0, 1; 1, 1, 1; 1, 1, 1; 1, 1, 1; 0, 0, 1; 0, 0, 1; 0, 0, 1; 0, 0, 1; 0, 0, 1) |
| 7 | (0, 0, 1; 0, 0, 1; 0, 0, 1; 1, 1, 1; 0, 0, 1; 0, 0, 1; 0, 0, 1; 0, 0, 1; 1, 1, 1; 1, 1, 1; 1, 1, 1; 1, 1, 1; 0, 0, 1; 1, 1, 1; 1, 1, 1; 1, 1, 1; 0, 0, 1; 1, 1, 1; 0, 0, 1; 0, 0, 1; 1, 1, 1; 0, 0, 1; 0, 0, 1; 0, 0, 1; 1, 1, 1; 0, 0, 1; 0, 0, 1; 0, 0, 1; 0, 0, 1; 1, 1, 1; 1, 1, 1) |

The example above is valid for 8PSK modulation, but the definition is identical for all modulations, the difference being the entries in the table.

For the sake of clarity the embodiments herein are described for 2×2 MIMO, but extensions to a larger number of layers are straightforward.

Figure 3:
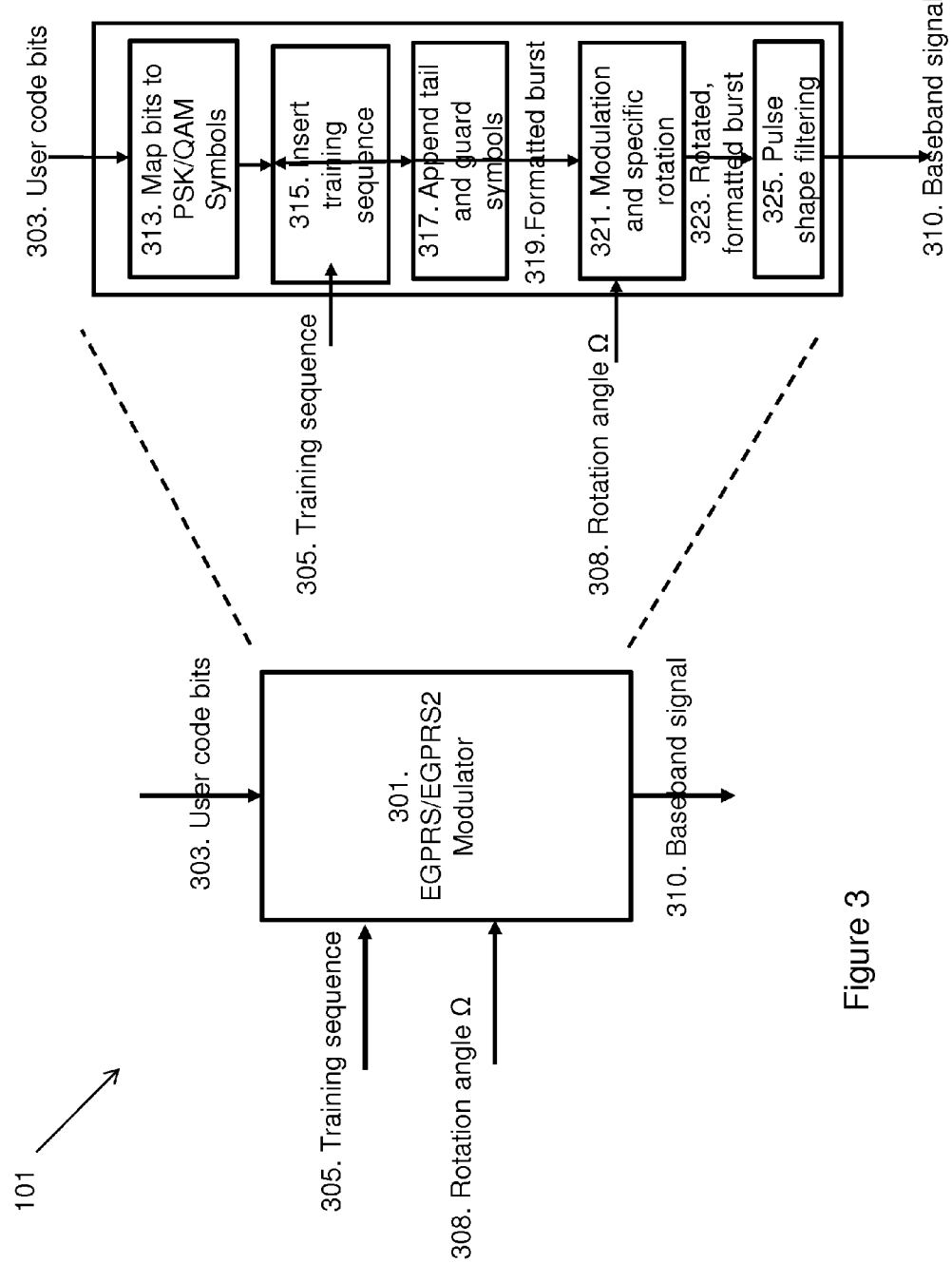
FIG. 3 is a schematic block diagram illustrating a high level description and detailed exploded view of embodiments of an EGPRS/EGPRS2 linear modulator.

Now, the transmitter 101 will be described in more detail. MIMO EGPRS/EGPRS2 Transmitter FIG. 3 shows transmitter 101 comprising an EGPRS/EGPRS2 linear modulator 301. The FIG. 3 shows a high level description, as well as an exploded view showing more details. Inputs to the EGPRS/EGPRS2 linear modulator 301 is, as shown in the left part of FIG. 3, user code bits 303, a training sequence 305 and a rotation angle Ω 308. The output of the EGPRS/EGPRS2 linear modulator 301 is a baseband signal 310. The right part of FIG. 3 shows more details of the EGPRS/EGPRS2 linear modulator 301. As mentioned above, the input to the EGPRS/EGPRS2 linear modulator 301 is user code bits 303. The user code bits 303 are mapped to PSK/QAM symbols 313. QAM is short for Quadrature amplitude modulation and is an analogue and digital modulation scheme. The training sequence 305 is inserted 315 when the bits are mapped, and tail and guard symbols are appended 317. Tail symbols are standardized symbols appended at the beginning and end of the data burst. Guard symbols are appended before or after the tail symbols. The data burst, comprising the tail and guard symbols in addition to the training sequence, is formatted 319. The data burst is subject to a modulation specific rotation 321 based on the rotation angle Ω. The rotated, formatted data burst 323 is subject to a pulse shape filtering 325 in order to output the baseband signal 310.

Note that a transmitter 101 comprises a modulator 301, but it also contains other components such as a power amplifier and other analogue components (not shown). The modulator 301 in the transmitter chain may be updated by means of software updates.

Figure 4:
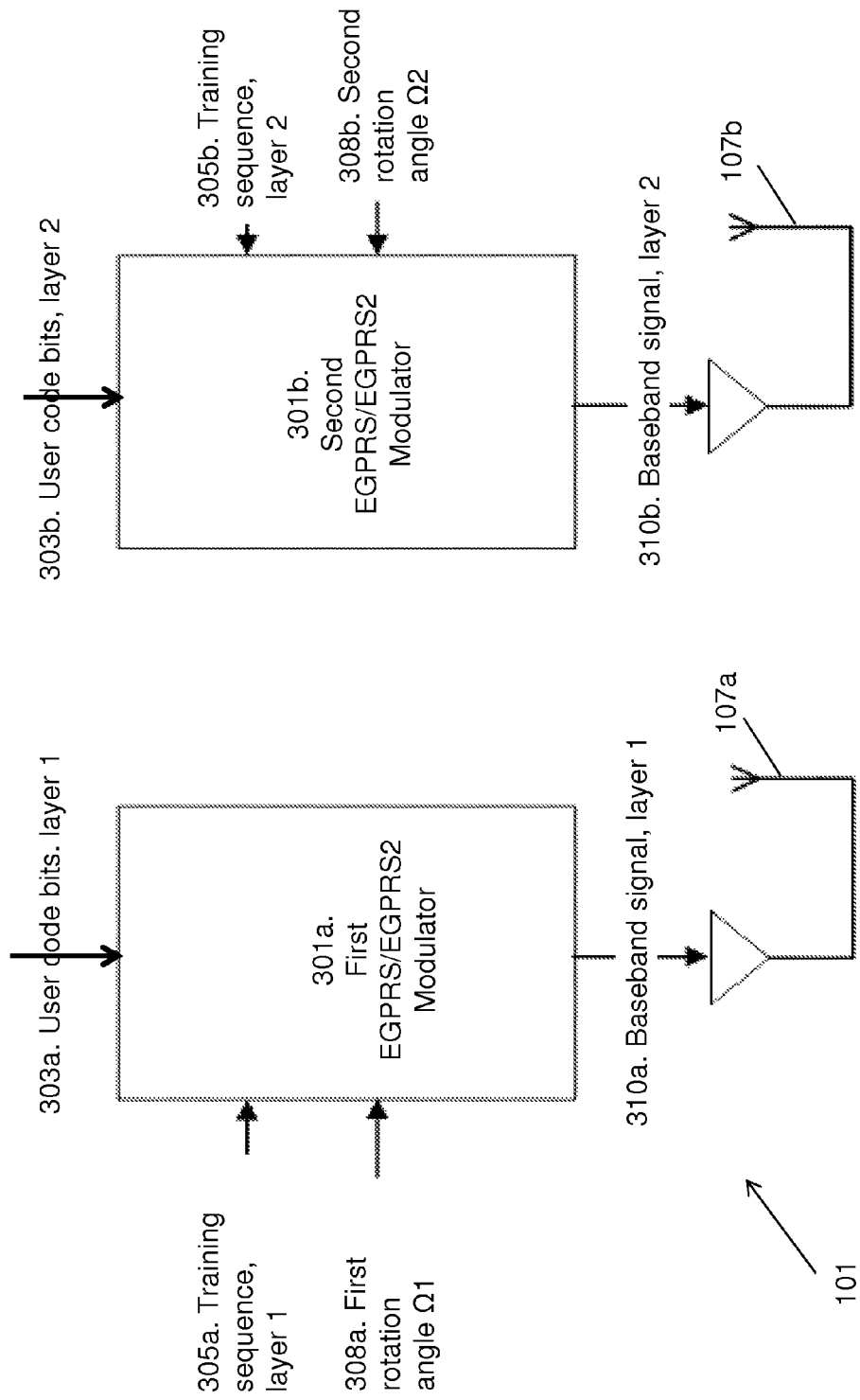
FIG. 4 is a schematic block diagram illustrating embodiments of a MIMO EGPRS/EGPRS2 transmitter.

Based on the EGPRS/EGPRS2 linear modulator 301 in FIG. 3, a transmitter 101 which is a MIMO EGPRS/EGPRS2 modulator by using two EGPRS/EGPRS2 modulators in parallel may be constructed. This is shown in FIG. 4. The reference numbers seen in FIG. 4 use the letter a when referring to layer 1 and the letter b when referring to layer 2. The transmitter 101 in FIG. 4 comprises a first EGPRS/EGPRS2 modulator 301a in parallel with a second EGPRS/EGPRS2 modulator 301b. The input to the first EGPRS/EGPRS2 modulator 301a, associated with layer 1, is user code bits for layer 1 303a, a training sequence for layer 1 305a and a first rotation angle $\Omega_1$ 308a. The output of the first EGPRS/EGPRS2 modulator 301a is a baseband signal for layer 1 310a, which is transmitted through the first Tx antenna 107a. The input to the second EGPRS/EGPRS2 modulator 301b, associated with layer 2, is user code bits for layer 2 303b, a training sequence for layer 2 305b and a second rotation angle $\Omega_2$ 308b. The user code bits for layer 1 and 2 may also be described as user code bits for data stream 1 and 2. The output of the first EGPRS/EGPRS2 modulator 301b is a baseband signal for layer 2 310b, which is transmitted through the second Tx antenna 107b. Notice that different rotations angles are allowed in each of the layers, in order to allow possibly different modulations in the two layers, layer 1 and 2. This MIMO EGPRS/EGPRS2 modulator in FIG. 4 is a slight generalization of a previously proposed modulator described in "MIMO Concept for EGPRS", 3GPP TSG GERAN #54, 14-18 May 2012, Nokia Siemens Networks, Nokia Corporation, China Mobile Com. Corporation. In addition to what was presented in the above mentioned "MIMO Concept for EGPRS", a finite codebook of precoding matrices $(W^p)_{p=1}^{P}$ is predefined.

Figure 5A:
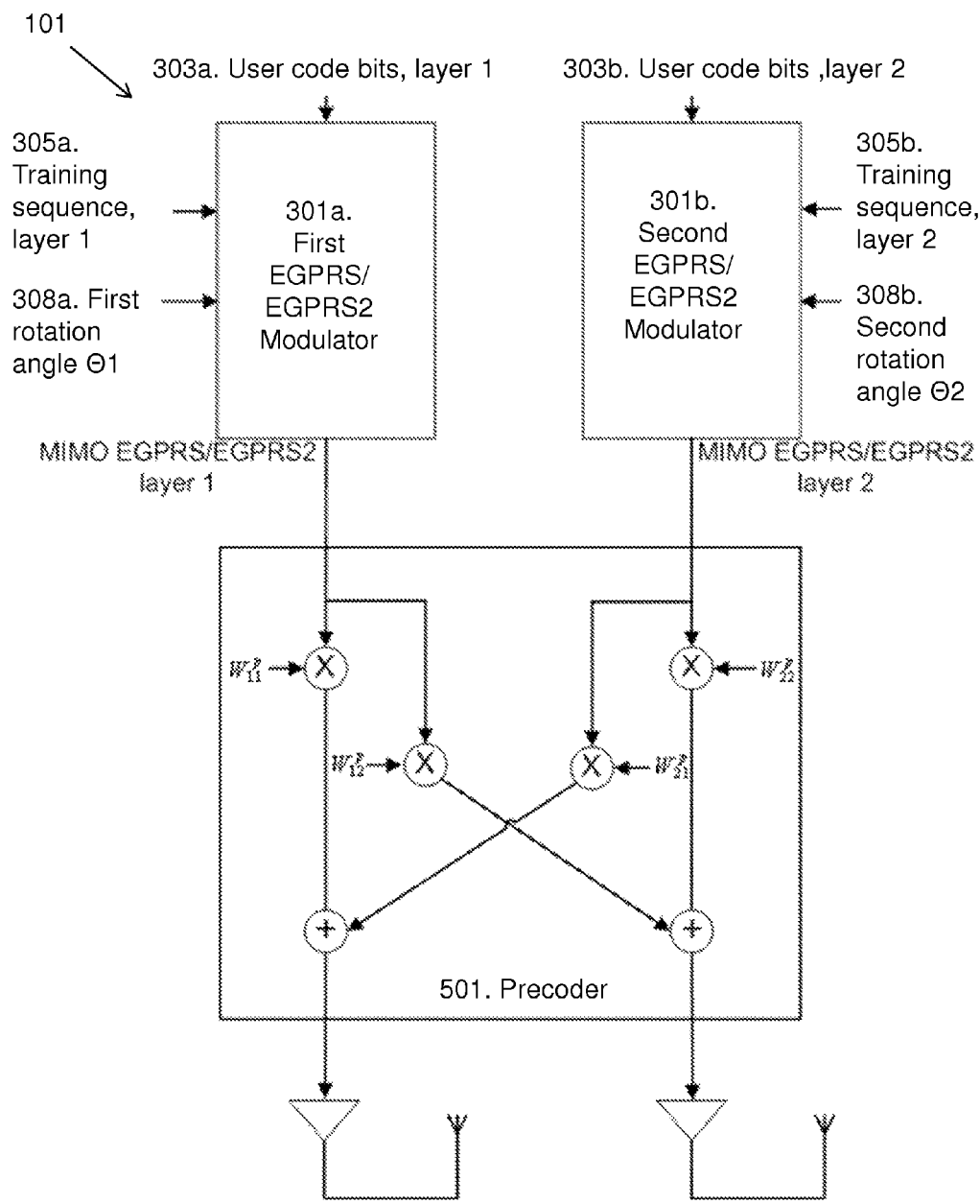
FIG. 5*a-b* are schematic block diagrams illustrating embodiments of a MIMO EGPRS/EGPRS2 transmitter with precoding.
Figure 5B:
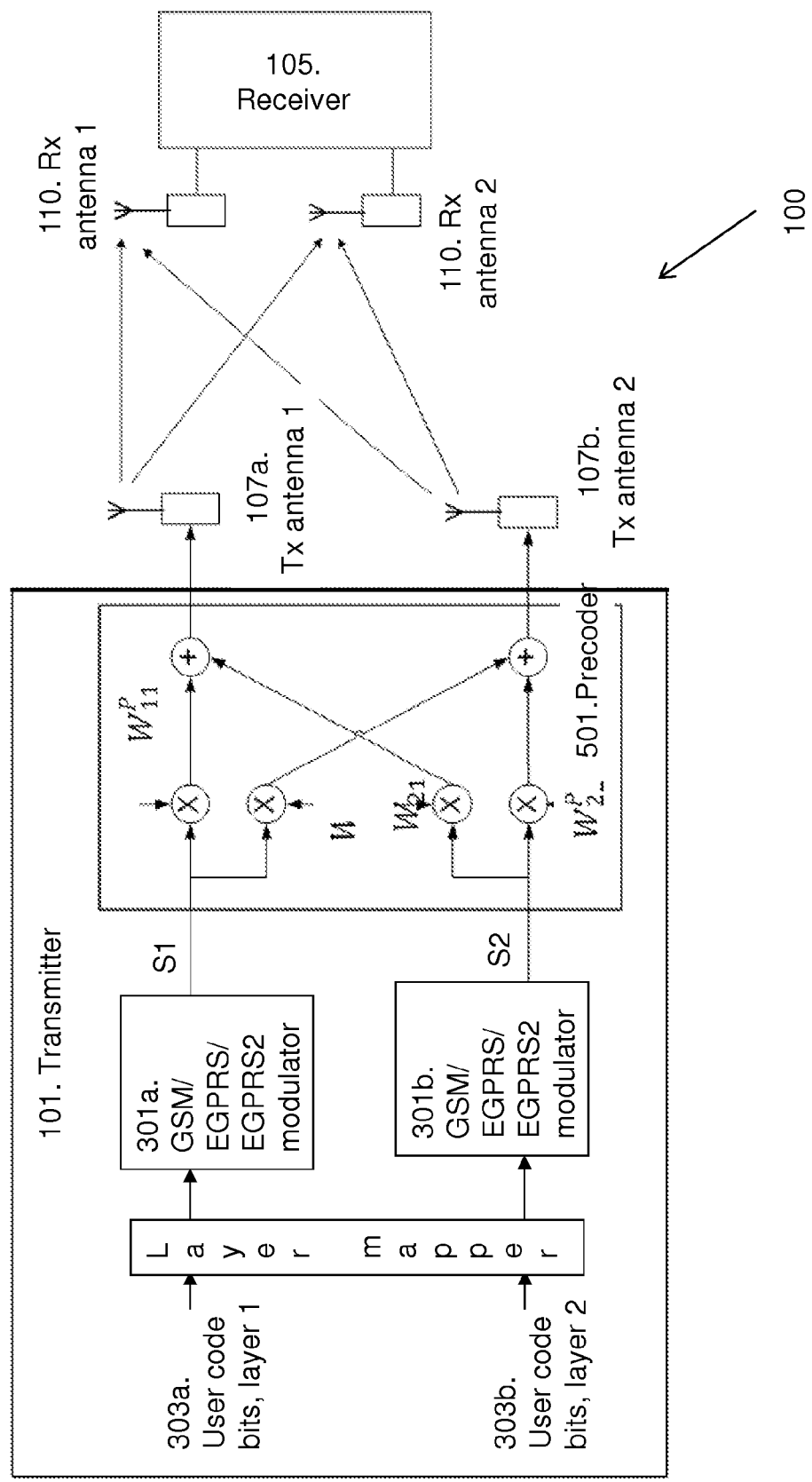

These precoding matrices exemplified in FIG. 4 are 2×2 or 1×2 matrices. When the precoding matrix $W^p$ is used, the transmitter 101 is modified since the precoder will perform a linear combination of the two layers and will also adjust the phases and amplitudes of the layers. The MIMO EGPRS/EGPRS2 transmitter 101 using precoding is illustrated in FIG. 5a and FIG. 5b. FIG. 5a shows the transmitter 101 using precoding and FIG. 5b shows the system 100 with the transmitter 101 using precoding and the receiver 105. As in FIG. 4, the transmitter 101 in FIG. 5a comprises a first EGPRS/EGPRS2 modulator 301a associated with layer 1 which has user code bits for layer 1 303a, a training sequence for layer 1 305a and a first rotation angle $\Theta_1$ 308a as inputs. The transmitter 101 in FIG. 5a further comprises a second EGPRS/EGPRS2 modulator 301b associated with layer 2 which has code bits for layer 2 303b, a training sequence for layer 2 305b and a second rotation angle $\Theta_2$ 308b as inputs. Furthermore, the transmitter 101 in FIG. 5 comprises a precoder 501. In this FIG. 4, the precoder 501 uses a precoding matrix $W^p$ which has been assumed to be 2×2 and its four components are as seen below in equation 1:

$$W^p = \begin{bmatrix} W^p_{11} & W^p_{12} \\ W^p_{21} & W^p_{22} \end{bmatrix} \quad (1)$$

The case of 1×2 matrices is covered by setting all the entries in one of the rows of $W^p$ to zero. That is, it is possible to set $W^p_{11}=0$, $W^p_{12}=0$, or to set $W^p_{21}=0$, $W^p_{22}=0$. In these cases single layer transmission is used.

The combination of beamforming and spatial multiplexing in the whole system 100 comprising both the two transmitters 101 and two receivers 105 is seen in FIG. 5b. S1 and S2 represent two data streams for spatial multiplexing, but a single data stream may also be used for beamforming only. Precoding (and beamforming) is accomplished by carefully adjusting the phase of the signals by multiplication the signals with weights ($W^p_{11}, W^p_{12}, W^p_{21}, W^p_{22}$) in FIG. 5b. A set of weights is called a precoder. In codebook based precoding, the possible precoders belong to a finite, predefined codebook. The precoder index is the index of the precoder in the codebook. In FIG. 5b, the superscript p in the weights W indicates the precoder index. The precoding weights may also be used in spatial multiplexing to maximize the SNR experienced at the receiving end.

To be able to select a good precoder, the transmitter 101 needs to have knowledge of channel(s) so the receiver side will need to feed channel information back to the receiver side. A "good precoder" is a precoder that gives the maximum increase in the SNR experienced at the receiever.

The transmitter 101 will alternate precoded and non-precoded transmissions. Precoded transmissions are desired in order to increase the SNR of the received signal. However, non-precoded transmissions are necessary to allow the receiver 105 to estimate the preferred precoder matrix in the codebook. One simple way to schedule the transmissions is to choose a positive integer K, for example K=8 or K=16, and transmit non-precoded data bursts every $K^{th}$ TDMA frames. In addition to K, a common reference in the TDMA frame structure needs to be described in the specifications for the user equipment and the base station. This process is illustrated by means of a flow diagram in FIG. 6 and pictorially in FIG. 7. The transmitter 101 (i.e. the network in case of downlink transmission) may dynamically change K during the duration of a call or data transmission. For example, small values of K may be more appropriate when the radio channel between the transmitter 101 and the receiver 105 varies rapidly.

As mentioned above, FIG. 6 illustrates an embodiment of a method for scheduling of precoded MIMO transmissions. The parameter K determines whether precoding is used. The method comprises the following steps, which steps may be performed in any suitable order:

Step 601

The transmitter 101 checks whether the TDMA Frame Number (FN) K is equal to 0. When FN mod K=0, the method proceeds to step 603. When FN mod K≠0, the method proceeds to step 602. mod is the modulo operation which finds the remainder of division of one number by another.

Step 602

Figure 6:
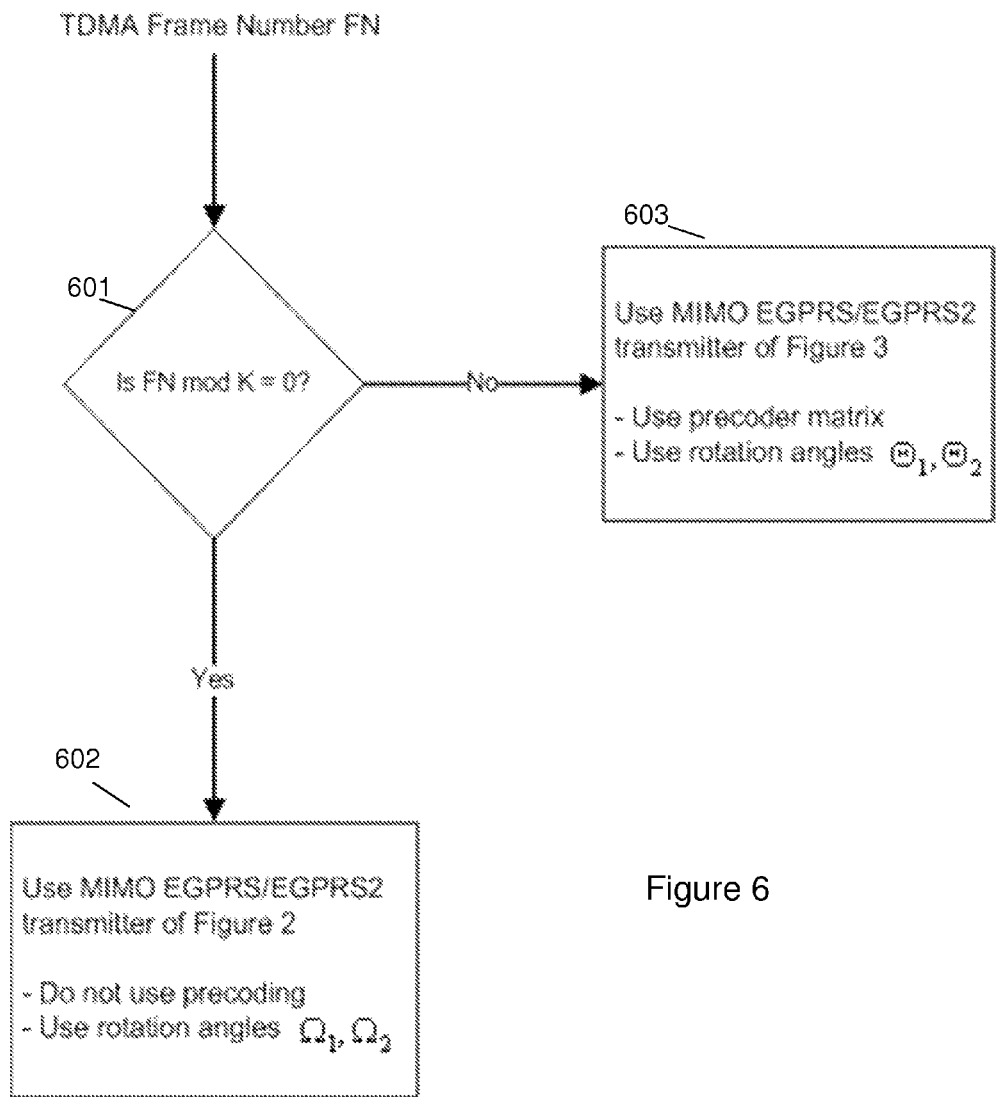
FIG. 6 is a flow chart illustrating embodiments of a method for scheduling of precoded MIMO transmission.
Figure 7:
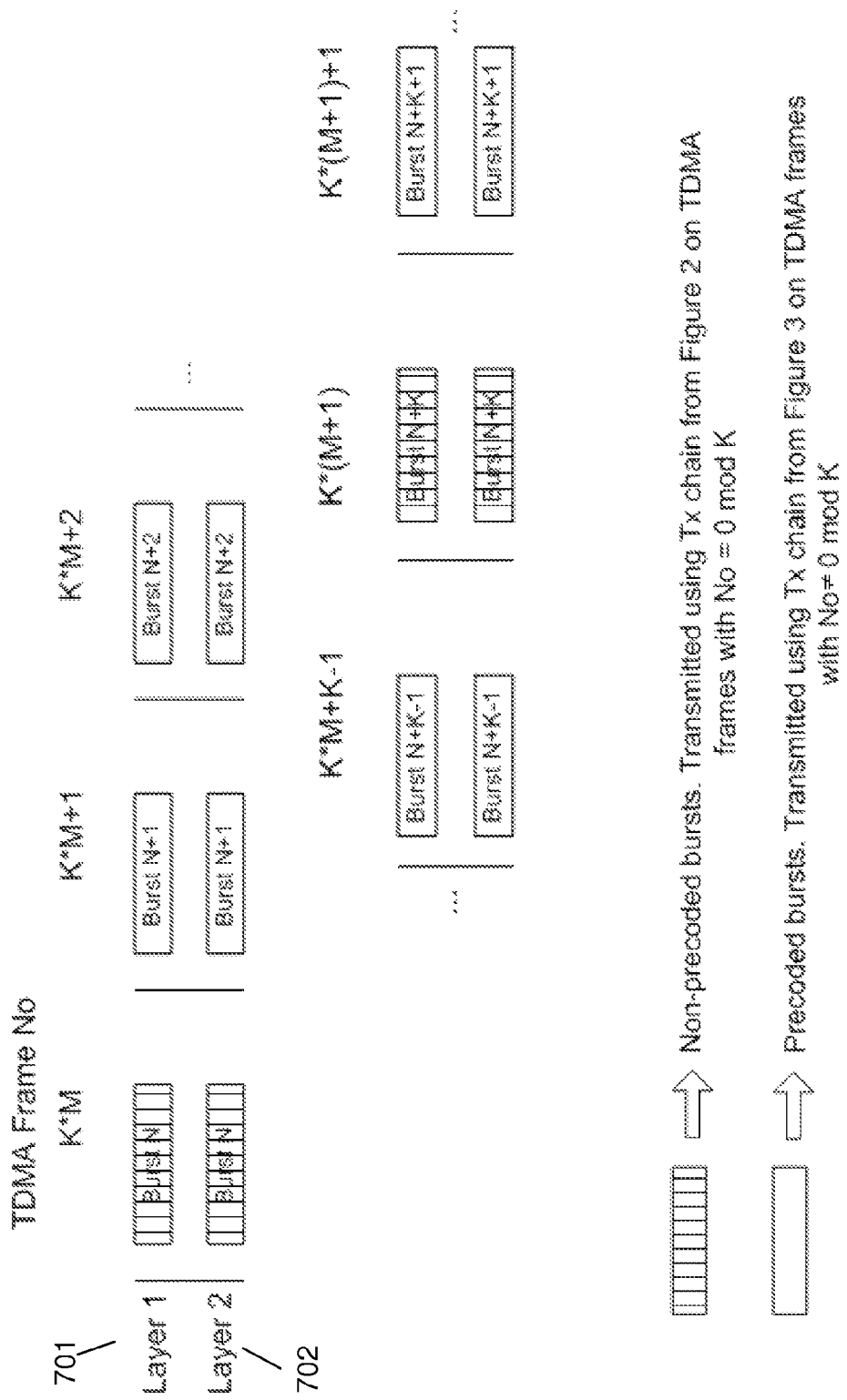
FIG. 7 is a schematic block diagram illustrating embodiments of scheduling of precoded/no precoded transmissions.

When FN mod K=0, indicated with "yes" in FIG. 6, the MIMO EGPRS/EGPRS2 transmitter 101 as shown in FIG. 4 is applied. Precoding is not used, and the rotation angles $\Omega_1$ and $\Omega_2$ are used.

Step 603

When FN mod K≠0, indicated with "no" in FIG. 6, the MIMO EGPRS/EGPRS2 transmitter 101 as shown in FIG. 5 is applied. Precoding is used, i.e. the precoder matrix, and the rotation angles $\Theta_1$ and $\Theta_2$ are used.

As mentioned above, FIG. 7 illustrates an embodiment of scheduling of precoded/non-precoded transmissions. The periodicity parameter K may be dynamically adjusted by the transmitter 101 (i.e. the network for downlink transmission). The upper row illustrates layer 1 701 and the bottom row illustrates layer 2 702. Each section illustrates a TDMA frame number, where the left most TDMA Frame is K*M and the right most TDMA Frame is K*(M+1)+1. M is a non-negative integer. The boxes comprising vertical lines represent non-precoded data bursts. The non-precoded data bursts are transmitted using the Tx chain from FIG. 4 on TDMA frames with No=0 mod K, where No is short for number. The empty boxes represent precoded data bursts. The precoded data bursts are transmitted using the Tx chain from FIG. 5 on TDMA frames with No≠0 mod K.

Precoder Detection

In some embodiments, the transmitter 101 indicates to the receiver 105 whether or not precoding is used. Some alternatives for signaling of the use of precoding are outlined in the following section.

Explicit Signaling in System Information (SI)

An information element may be added to a system information element transmitted in each cell on a Broadcast Control CHannel (BCCH). The information element would then comprise the parameter K, described above. K may be changed over time, and will apply for all user equipments in the cell capable of performing MIMO transmission.

Dedicated Signaling

In order to apply different frequency of occurrence (K) of the non-precoded data burst to different users, dedicated signaling may be utilized, where an information element in a signaling message is used to convey K. Alternatively, the signaling message may be used to switch between non-precoded and precoded transmission. The dedicated signaling may e.g. be transmitted on the Packet Associated Control CHannel (PACCH), using a dedicated radio block on the downlink. The K-value may also be signaled to the receiver 105 during call setup or during Temporary Block Flow (TBF) establishment.

Dedicated in-Band Signaling

To minimize signaling overhead, the dedicated signaling information may be conveyed by re-defining the header fields in the current header definitions in 3GPP. For EGPRS2 there are also spare bits available in the header field that may be used to indicate K, or switching between non-precoded and precoded transmission.

Implicit Signaling by Symbol Rotation

In GSM/EDGE today, different rotation angles are used to distinguish between different modulations in EGPRS/EG-PRS2. The use of symbol rotation may be extended to use additional rotations to indicate whether or not precoding is used. In FIG. 4 (no precoding), the layers are rotated by the angles $\Omega_1, \Omega_2$, while in FIG. 5a-b the layers are rotated by angles $\Theta_1, \Theta_2$. This allows the receiver 105 to blindly detect whether precoding has been used at the transmitter 101. The dynamical nature of K poses no problem at the receiver 105 side since the rotation angles are used to blindly detect whether precoding is used in the data burst. Rotating the layers means rotating all the transmitted symbols (data+training sequence) with the rotation angle. In some embodiments, only the training sequence may be rotated with the rotation angle.

Implicit Signaling by New TSC Definitions

In GSM/EDGE today there are eight different TSCs defined for Packet Switched (PS) services and eight additional TSCs defined for circuit switched services by the VAMOS feature. Different TSCs need to be used for the different layers in MIMO, in order for the receiver 105 to separate the transmitted layers. In addition, an additional set of orthogonal TSCs may be defined to signal whether or not precoding is used. This approach is similar to implicit signaling by symbol rotation since a rotated TSC may also be seen as a "new" TSC.

Now, the receiver 105 will be described in more detail.

MIMO EGPRS/EGPRS2 Receiver

In some embodiments, the receiver 105 detects the rotation angles of the two layers, i.e. rotating angles of the data burst and the training sequence. When $\Theta_1, \Theta_2$ are detected, the receiver 105 knows that precoding has been used. On the other hand, when $\Omega_1, \Omega_2$ are detected, then the receiver 105 determines that precoding has not been used. In this case, the receiver 105 may also estimate the preferred (instantaneous) precoding matrix from the codebook. The preferred precoding matrix is the matrix that if it had been used (hypothetically), it would have resulted in the best signal quality for the current data burst. The signal quality may be measured in terms of the SNR, bit error rate or other quality statistics. The determination of the preferred precoding matrix from the codebook may be accomplished as follows. The signal received by the receiver 105 over the training sequence (after derotation) may be described by a linear 2×2 MIMO model on the following form:

$$Y = S \cdot H + T \cdot G + E \quad (2)$$

where Y is the matrix of received samples, S is a regression matrix for layer 1, H represents the L-tap channel for layer 1, T is a regression matrix for layer 2, G represents the L-tap channel for layer 2 and E is the is a noise plus interference matrix. L-tap is a way to say that the channel is modeled as a Finite Impulse Response (FIR) filter having L coefficients. Each coefficient is called a "tap".

The matrix of received samples Y may be as follows:

$$Y = \begin{bmatrix} y_A(n_0+L) & y_B(n_0+L) \\ \vdots & \vdots \\ y_A(n_0+N) & y_B(n_0+N) \end{bmatrix} \quad (3)$$

The regression matrices S and T comprising known training symbols $(s(n))_{n=1}^{N}$ for layer 1 and $(t(n))_{n=1}^{N}$ for layer 2 may be as follows:

$$S = \begin{bmatrix} s(L) & \cdots & s(1) \\ \vdots & \ddots & \vdots \\ s(N) & \cdots & s(N-L+1) \end{bmatrix} \quad (4)$$

and $$T = \begin{bmatrix} t(L) & \cdots & t(1) \\ \vdots & \ddots & \vdots \\ t(N) & \cdots & t(N-L) \end{bmatrix} \quad (5)$$

The matrices H and G which are the L-tap channels for layers 1 and 2 respectively may be as follows:

$$H = \begin{bmatrix} h_A(1) & h_B(1) \\ \vdots & \vdots \\ h_A(L) & h_B(L) \end{bmatrix} \quad (6)$$

and $$G = \begin{bmatrix} g_A(1) & g_B(1) \\ \vdots & \vdots \\ g_A(L) & g_B(L) \end{bmatrix} \quad (7)$$

The matrix E which is a noise plus interference matrix may be as follows:

$$E = \begin{bmatrix} e_A(n_0+L) & e_B(n_0+L) \\ \vdots & \vdots \\ e_A(n_0+N) & e_B(n_0+N) \end{bmatrix} \quad (8)$$

A, B label the two Rx antennas of the receiver 105, $n_0$ is the synchronization position and N is the total number of training symbols. A typical value of L in GSM/EDGE may be L=5. In EGPRS and EGPRS2-A, N=26 while in EGPRS2-β, N=31.

The training sequences for the two layers are designed with good orthogonality properties, so that $$S^H T = 0_{L \times L} \quad (9)$$

where $0_{L \times L}$ denotes the matrix of zeros of dimension L×L. Therefore, when the transmission has not been precoded, the receiver 105 may estimate the two vector channels H from the first Tx antenna 107 and to the two Rx antennas 110 A, B, and G from the second Tx antenna 107 to the two Rx antennas 110 A, B. Equation (9) implies that the two data bursts are "orthogonal" over the training sequence. In a 2×2 MIMO system there are four channels (one from each Tx to each Rx). Consider an example where the four channels are called H1, H2, G1, and G2. For example H2 is the channel from Tx1 to Rx2, and G1 is the channel from Tx2 to Rx1. The signal received by Rx2 is a superposition of the two signals transmitted by both Tx's, that is, a mixture involving H2 and G2.

But the special choice of training sequences in equation (9) makes it possible to separate channel H2 from channel G2 so that the channels H2 and G2 may be estimated separately. Similarly, H1 and G1 may also be estimated separately. For example the least squares estimate, and using equation (4), may be $$\hat{H}=(S^H S)^{-1} S^H Y \approx H(S^H S)^{-1} S^H E = H + E' \quad (10)$$

$$\hat{G}=(T^H T)^{-1} T^H Y \approx G(T^H T)^{-1} T^H E = G + E'' \quad (11)$$

When the SNR is high enough, the noise components E', E" are negligible and the estimation is accurate. The size of SNR depends on the modulation.

Given the estimates of H and G, obtained for example by equations (5) and (6), it is well known in the art how to estimate the precoder matrix $W^p$ which belongs to the codebook that would have resulted in the highest signal quality for the current data burst. For example, using the estimates of equations (5) and (6), the model in equation (2) may be re-cast in the following form:

$$Y = \tilde{S}_p \cdot \hat{H} + \tilde{T}_p \cdot \hat{G} + E \quad (12)$$

where $\tilde{S}_p = W_{11}^p \cdot S + W_{21}^p \cdot T$ and $\tilde{T}_p = W_{12}^p \cdot S + W_{22}^p \cdot T$. The preferred precoder $W^p$ may be chosen, for example, as the precoder that maximizes the SNR.

Hence, when the data burst is not precoded, the orthogonality of the training sequences, allows the receiver 105 to produce an estimate $\hat{p}$ of the index p in the precoder codebook that would have given the best signal quality to the current data burst.

Figure 8:
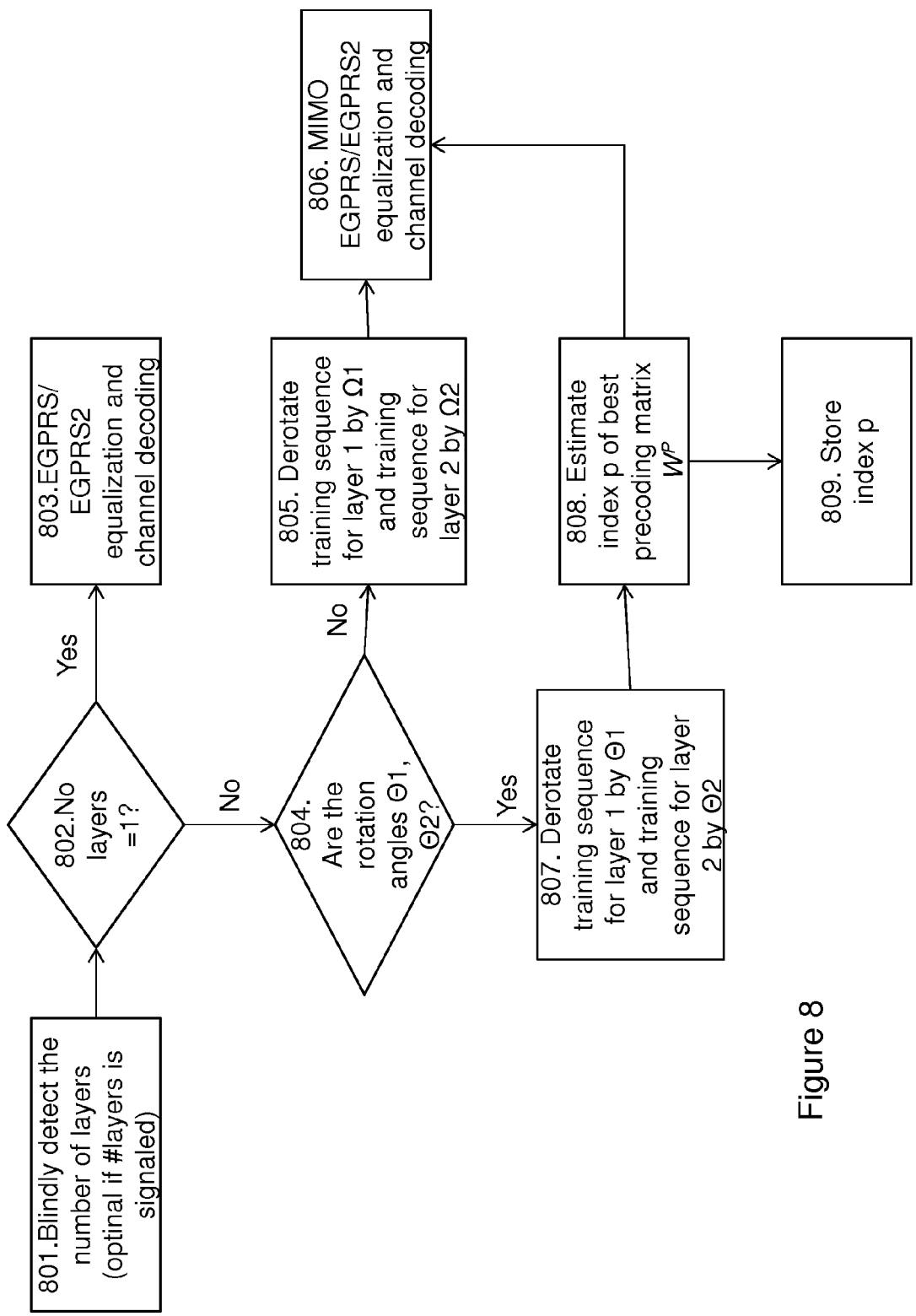
FIG. 8 is a flow chart illustrating embodiments of a method in a MIMO EGPRS/EGPRS2 receiver. The occurrence of precoding is blindly detected at the receiver.

An embodiment of a method for the receiver 105 processing is depicted in the flow diagram in FIG. 8. Observe that the estimated index of the precoder in the codebook is stored in a memory for further processing and reporting by the receiver 105. The occurrence of precoding is blindly detected at the MIMO EGPRS/EGPRS2 receiver 105. The method comprises the following steps, which steps may be performed in any suitable order:

Step 801

This is an optional step. The receiver 105 may blindly detect the number of layers. Note that this step 801 is not performed when the number of layers is signaled form the transmitter 101 to the receiver 105.

Step 802

The receiver 105 checks whether the number of layer is one. When the number of layers is one, the method proceeds to step 803 and when the number of layers is different from one, the method proceeds to step 804.

Step 803

When the number of layers is one, indicated with "yes" in FIG. 8, the receiver 105 performs EGPRS/EGPRS2 equalization and channel decoding.

Step 804

When the number of layer is different from one, indicated with "no" in FIG. 8, the receiver 105 checks whether the rotation angles $\Theta_1$ and $\Theta_2$ are applied to the training sequences for layers 1 and 2. When they are not applied, the method proceeds to step 805. When they are applied, the method proceeds to step 807.

Step 805

When step 804 resulted in that the rotation angles $\Theta_1$ and $\Theta_2$ are not applied, indicated with "no" in FIG. 8, the receiver 105 derotates the training sequence for layer 1 by $\Omega_1$ and the training sequence for layer 2 by $\Omega_2$. Derotating implies that a rotation by an angle equal to the negative of the rotation angle is applied to the received samples. Thus, derotating by an angle alpha is equivalent to rotation by an angle –alpha.

Step 806

This step is performed after step 805 and after step 808. The receiver 105 performs MIMO EGPRS/EGPRS2 equalization and channel decoding.

Step 807

When step 804 resulted in that the rotation angles $\Theta_1$ and $\Theta_2$ are applied, indicated with "yes" in FIG. 8, the receiver 105 derotates the training sequence for layer 1 by $\Theta_1$ and the training sequence for layer 2 by $\Theta_2$.

Step 808

This step is performed after step 807. The receiver 105 estimates index p of the preferred precoder matrix $W^p$. Based on the estimate, the receiver 105 proceeds to step 806, as described above in order to perform the MIMO EGRPS/EGPRS2 equalization and channel decoding.

Step 809

The receiver 105 stores the index p in a memory.

When it is known at the receiver 105 whether precoding is used or not, by signaling or handshaking, then the blind detection of precoding need not be performed. For example the receiver 105 may know the value of the parameter K that controls the periodicity of the non-precoded transmissions. In this case, an embodiment of the method for the receiver 105 processing is depicted in the flow diagram in FIG. 9. Observe that the estimated index of the precoder in the codebook is stored in a memory for further processing and reporting by the receiver 105. The input to the method is the received signals from all Tx antennas of the transmitter 101. The method comprises the following steps, which steps may be performed in any suitable order:

Step 901

This is an optional step. The receiver 105 blindly detects the number of layers. Note that this step 901 is not performed when the number of layers is signaled form the transmitter 101 to the receiver 105.

Step 902

The receiver 105 checks whether the number of layer is one. When the number of layers is one, the method proceeds to step 903 and when the number of layers is different from one, the method proceeds to step 904.

Step 903

Figure 9:
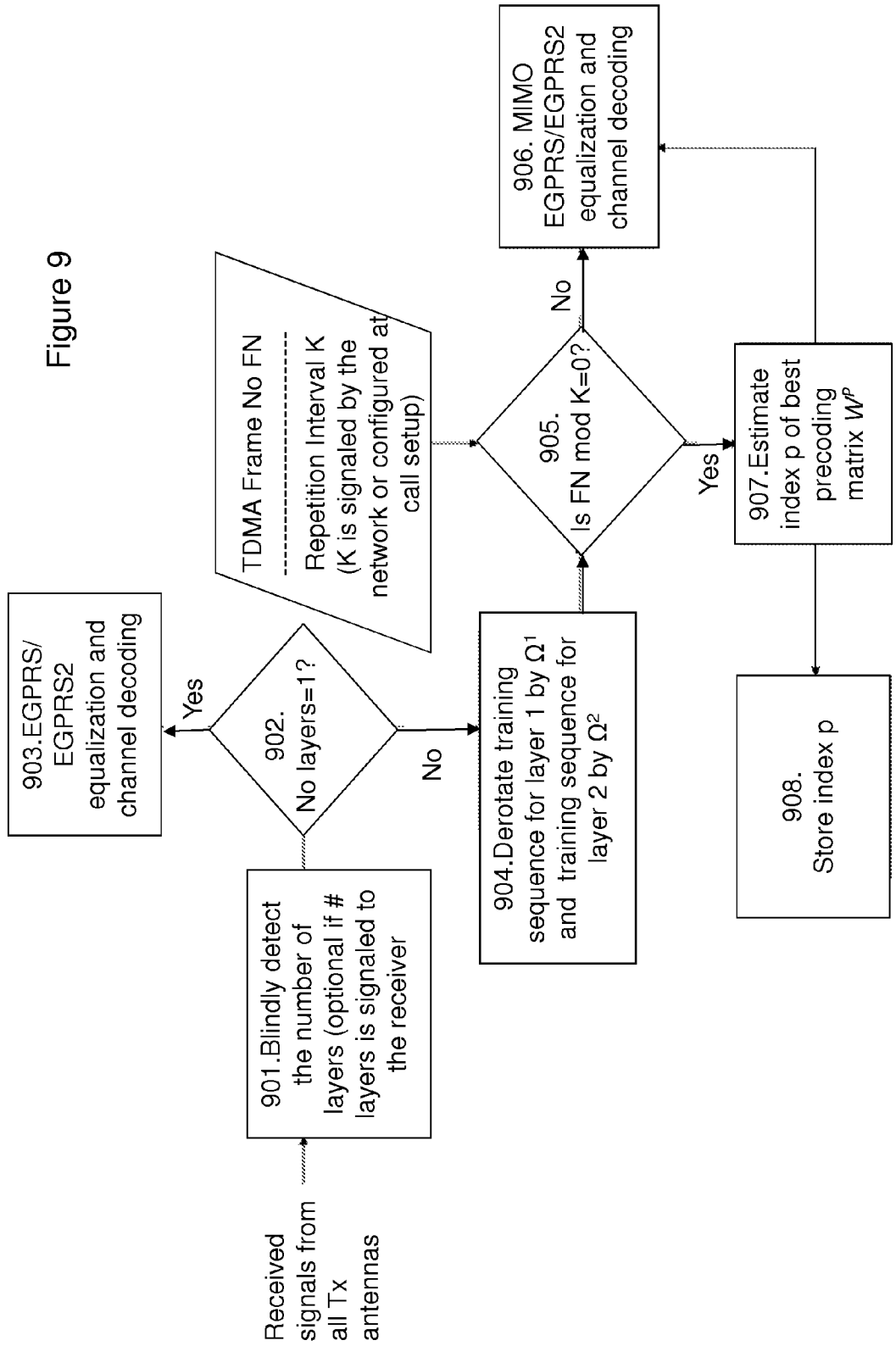
FIG. 9 is a flow chart illustrating embodiments of a method in a MIMO EGPRS/EGPRS2 receiver. The occurrence of precoding is known at the receiver.

When the number of layers is one, indicated with "yes" in FIG. 9, the receiver 105 performs EGPRS/EGPRS2 equalization and channel decoding.

Step 904

When the number of layer is different from one, indicated with "no" in FIG. 9, the receiver 105 derotates the training sequence for layer 1 by $\Omega_1$ and the training sequence for layer 2 by $\Omega_2$.

Step 905

The receiver 105 checks whether the TDMA frame number FN mod K=0. K is a repetition interval and signaled by the transmitter 101, e.g. the network, or configured at call setup. When it is equal to zero, the method proceeds to step 907. When it is not equal to zero, the method proceeds to step 906.

Step 906

This step is performed after step 905 and after step 907. When FN mod K is different from zero, indicated with "no" in FIG. 9, the receiver 105 performs MIMO EGPRS/EGPRS2 equalization and channel decoding.

Step 907

When FN mod K=0, indicated with "yes" in FIG. 9, the receiver 105 estimates the index p of the preferred precoding matrix $W^p$. After the estimation of the index p, the method proceeds to step 905.

Step 908

The receiver 105 stores the index p.

Figure 10:
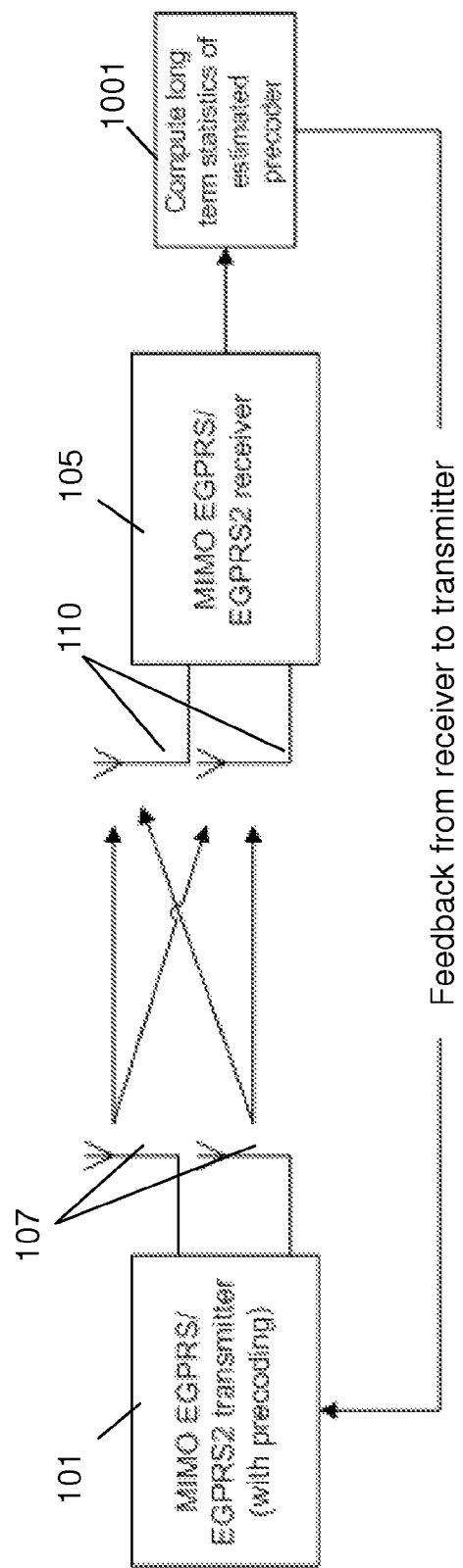
FIG. 10 is a schematic block diagram illustrating embodiment of that the receiver feeds back long term statistics of the precoder estimates to the transmitter.

The precoder estimates are performed for each non-precoded data burst. These estimates are analyzed by the receiver 105 and long term statistics are computed and fed back to the transmitter 101. Long term statistics refer to statistics calculated over time periods much greater than the coherence time of the channel. In practice, these time periods may be of the order of 0.5 s or 1 s. This feedback mechanism is shown in FIG. 10. In FIG. 10, the transmitter 101 is a MIMO EGPRS/EGPRS2 transmitter with precoding. The receiver 105 is a MIMO EGPRS/EGPRS2 receiver 105 which computes a long term statistics of the estimated precoder and feeds it back to the transmitter 1001.

Capability Signalling

In order for the transmitter 101 to know that the receiver 105 supports the MIMO feature, and in particular the closed loop MIMO transmission schemes, it needs to be indicated to the transmitter 101 in for example the Radio Access Capability Information Element (IE) of the receiver 105.

Closed Loop MIMO for EGPRS/EGPRS2

Above, a concept of closed loop MIMO for enhanced data rates for EGPRS/EGPRS2 is described which unlike LTE, does not rely on fast feedback. It exploits the fact that for a given data transmission, there may be preferred phases/amplitudes of the transmitted signals that give gains over fixed or random phases, over time periods much larger than the coherence time of the channel. Since the time periods over which the phases/amplitudes are kept constant are of the order of a few seconds, the latency of EGPRS/EGPRS2 does not prevent the receiver 105 to provide useful feedback to the transmitter 101.

The characteristics of the radio channel between the transmitter 101 and the receiver 105 may be modified from data burst to data burst by using different precoding matrices. Codebook based precoding, similar to that used in LTE, is employed. Not all data bursts are precoded. At the receiver side, the receiver 105 may blindly detect the use of precoding by for example detecting the rotation of the training sequences. Some rotation angles are used for precoded data bursts and a different set of rotation angles are used for non-precoded data bursts. When a data burst is not precoded, the receiver 105 may estimate the preferred precoding matrix among the finite set of precoding matrices in the codebook. The receiver 105 feeds back long term statistics of the estimated precoder to the transmitter 101, in a way compatible with existing mechanisms for feedback in GSM.

Channel Quality Reporting in Different 3GPP Radio Access Technologies (RAT)

LTE/HSPA Reporting for MIMO

The LTE measurement report from the receiver 105 comprises the CQI so that the transmitter 101 may select modulation and code rate, the PMI to suggest to the transmitter 101 what precoder (out of a predefined codebook) that should be used and also the RI that represents the number of layers that the transmitter 101 shall use for the next transmission, e.g. a downlink transmission.

This information is reported often enough to follow the changing channel conditions. For high speeds, the information may be reported as often as once per sub-frame (1 ms), but this interval may be increased for e.g. pedestrian speeds, maybe 10 ms.

For the present embodiments, HSPA may be considered comparable to LTE with regards to MIMO reporting.

GPRS/EDGE Reporting without MIMO

For GSM packet services, the measurement report comprises the mean bit error rate, referred to as MEAN_BEP, along with measure of the bit error rate standard deviation, referred to as CV_BEP.

The report may in principle be sent once every 20 ms, or 10 ms, for Basic Transmission Time Interval (BTTI) and Reduced Transmission Time Interval (RTTI) respectively, but that would consume UpLink (UL) resources that may otherwise be used for uplink data. Also, uplink network interference levels would increase. A more realistic reporting interval may be 100 ms, but this value may be smaller or larger depending on multi-slot class and the amount of available data.

In light of above description, it may be realized that the GSM receiver, with the current transmission structure in GSM/EDGE, cannot report channel information back to the transmitter 101 as quickly as the LTE and HSPA receiver may. Therefore MIMO techniques cannot work in GSM based on the same reporting principles since channel information needs to be updated quickly and often.

Further, as is described above, the closed loop MIMO may bring gains to GSM/EDGE and thus the current channel quality reporting would benefit from being updated to support closed loop MIMO transmissions.

In the exemplary description below, new updated channel conditions are assumed to be available to the receiver 105 on a regular basis. One method that may be used to provide measurements of channel conditions at the receiver 105 is described above.

Figure 11:
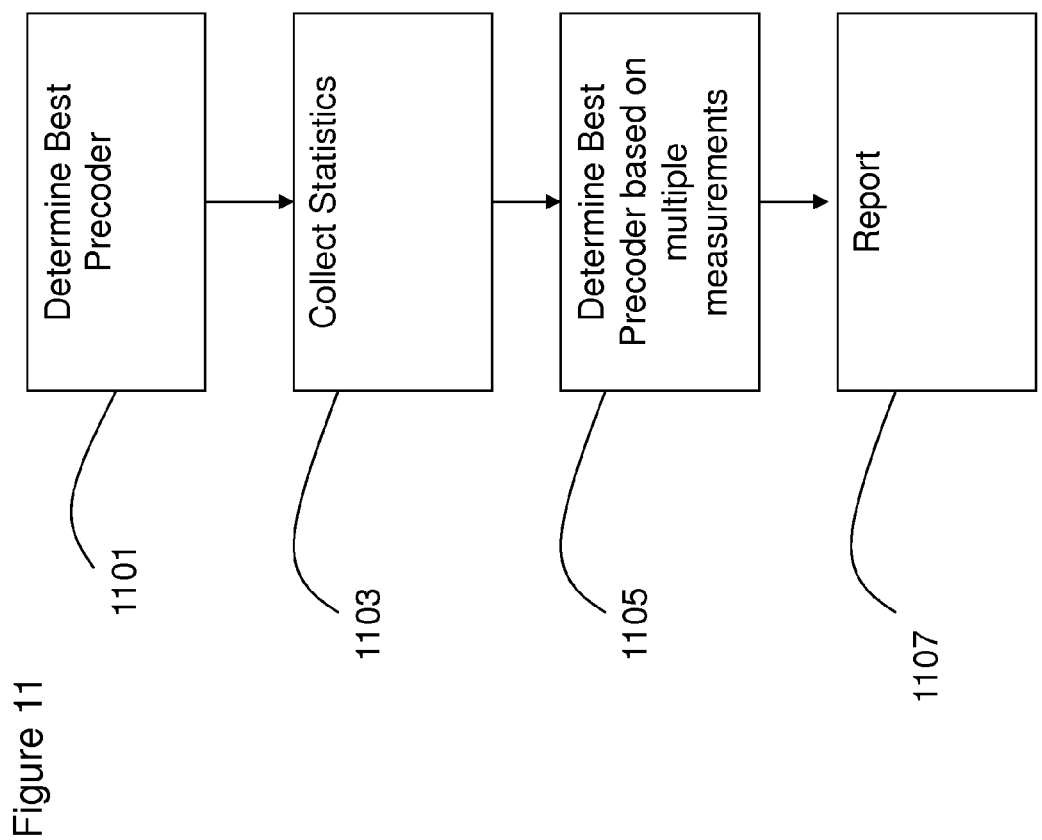
FIG. 11 is a flow chart illustrating some steps performed in a receiver.

In the below exemplary description it is further assumed that the receiver 105 knows the number of Tx antennas at the transmitter 101 and the number of data layers being transmitted. This may for example be conveyed to the receiver 105 through broadcasting or dedicated signaling. The number of data layers may also be blindly detected by the receiver 105, e.g. detecting the number of training sequences in the channel. This knowledge would make it considerably easier for the receiver 105 to make an accurate recommendation on the preferred precoder for the transmitter 101 to use, but is optional. In accordance with one embodiment the following steps depicted in FIG. 11 are performed by the receiver 105.

Step 1101

This step corresponds to step 204 in FIG. 2. First, the receiver 105 determines the preferred precoder for a single measurement. The single measurement refers to the estimation of the preferred precoder using only one burst Step 1103

This step corresponds to step 204 in FIG. 2. Then, the receiver 105 collects statistics of a number of measurements. One measurement refers to the estimation of the preferred precoder using only one burst Step 1105

This step corresponds to step 204 in FIG. 2. Then, the receiver 105 determines the preferred precoder based on the multiple measurements collected in step 1103.

Step 1107

This step corresponds to step 205 in FIG. 2. The outcome of step 1105 is then reported to the transmitter 101.

The above steps may in accordance with some exemplary embodiments be implemented as follows. For step 1101, the criterion to determine the preferred precoder may be based on one or many quality measures like the highest received signal strength, e.g. RXLEV, highest estimated signal-to-noise ratio or lowest bit error rate. The criterion/criteria used to determine the preferred precoder may be specified in some general specification to allow for a consistent implementation between receiver vendors.

Figure 12:
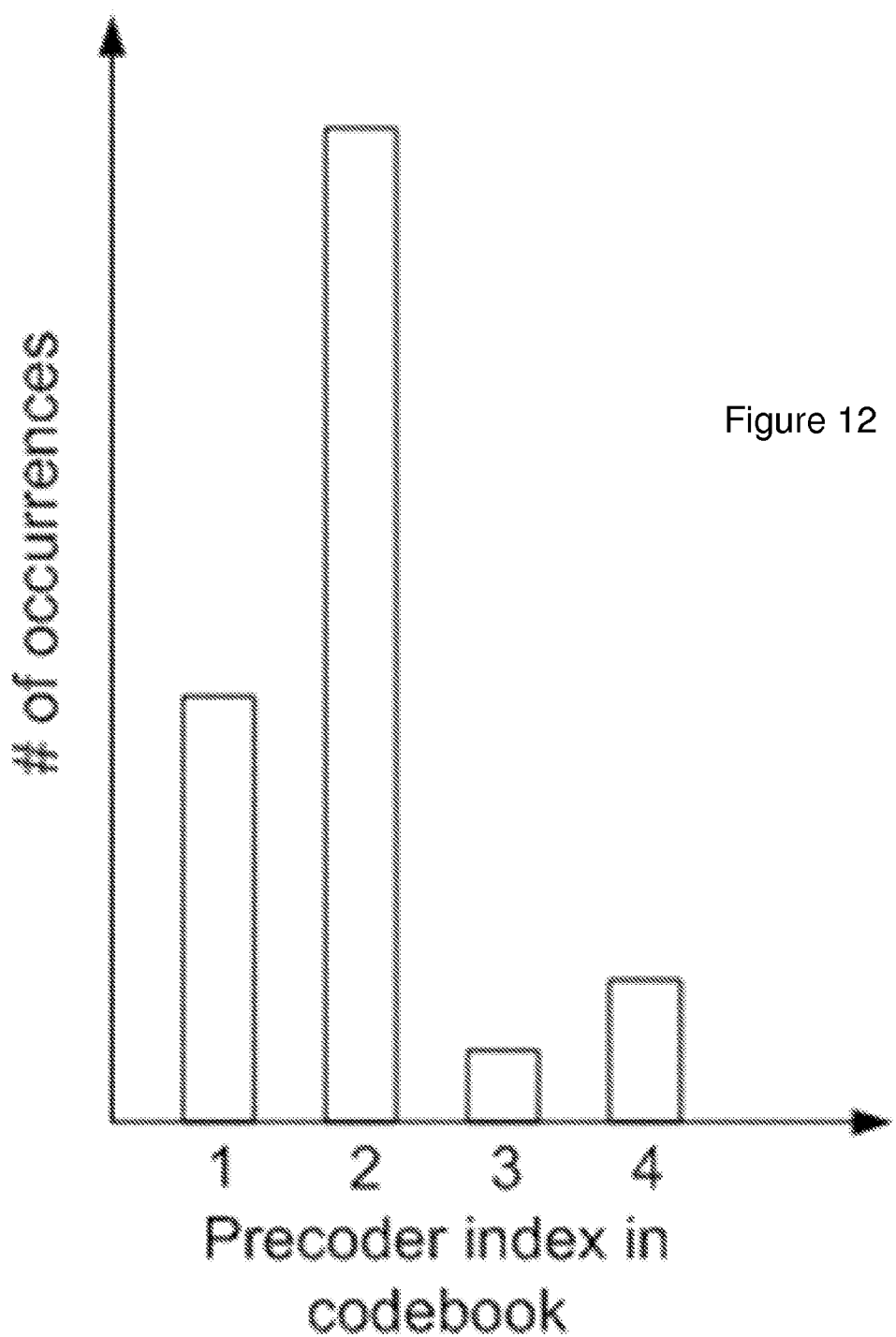
FIG. 12 is an exemplary histogram.

In step 1103, the preferred precoder for each measurement may be recorded in a histogram, counters or similar. See example in FIG. 12, where it has been assumed that the system 100 is limited to four pre-defined precoder indexes. The x-axis of FIG. 12 represents the precoder index in the codebook. The y-axis of FIG. 1 represents the number of occurrences of each measurement. As seen in FIG. 12, precoder index 2 in the codebook has the highest number of occurrences, and precoder index 3 in the codebook has the lowest number of occurrences. This means that the precoder index is selected.

The receiver 105 may also be configured to record statistics filtered over time or over reporting periods, i.e. to clear the recording once a report to the transmitter 101 has been made.

Similar to the MEAN_BEP and CV_BEP values collected today by a conventional receiver, a possible implementation of the filtering over time, or over the reporting period, may be achieved with a forgetting factor and a dependence on the existence of a precoder estimate in a certain measurement opportunity. In 3GPP Technical Specification TS45.008, "Radio subsystem link control" current procedures for MEAN_BEP and CV_BEP are described.

In contrast to current channel quality measurements performed by the receiver 105, the precoder measurements may be performed on data bursts/blocks not intended for the receiver 105, as long as the receiver 105 may detect/know whether or not the data burst was precoded. In the text above, more information on transmission and reception techniques to signal/detect precoding, are described. This will enable more statistics to be collected during a shorter amount of time, compared to only collect statistics from blocks intended for the receiver 105.

In step 1105 in FIG. 11, the preferred precoder based on multiple measurements is determined. It is possible to envisage several ways to describe the statistics. A straightforward way is to pick the precoder that has been determined to be the best choice the most number of times during the reporting period, along with its occurrence rate in the total number of samples (#selection of preferred precoder/total number of decisions). To further refine this method, the receiver 105 may in one exemplary embodiment be configured to determine the preferred precoder based on the average value of the hypotheses confidences, i.e. not collect statistics based on a firm decision each data burst but rather use an average/filtering approach on the calculated metrics (e.g. estimated SNR).

An alternative approach may be to use a time dependent filtering (as for step 1103 in FIG. 11), where the precoder with the highest filtered value is reported.

Figure 13:
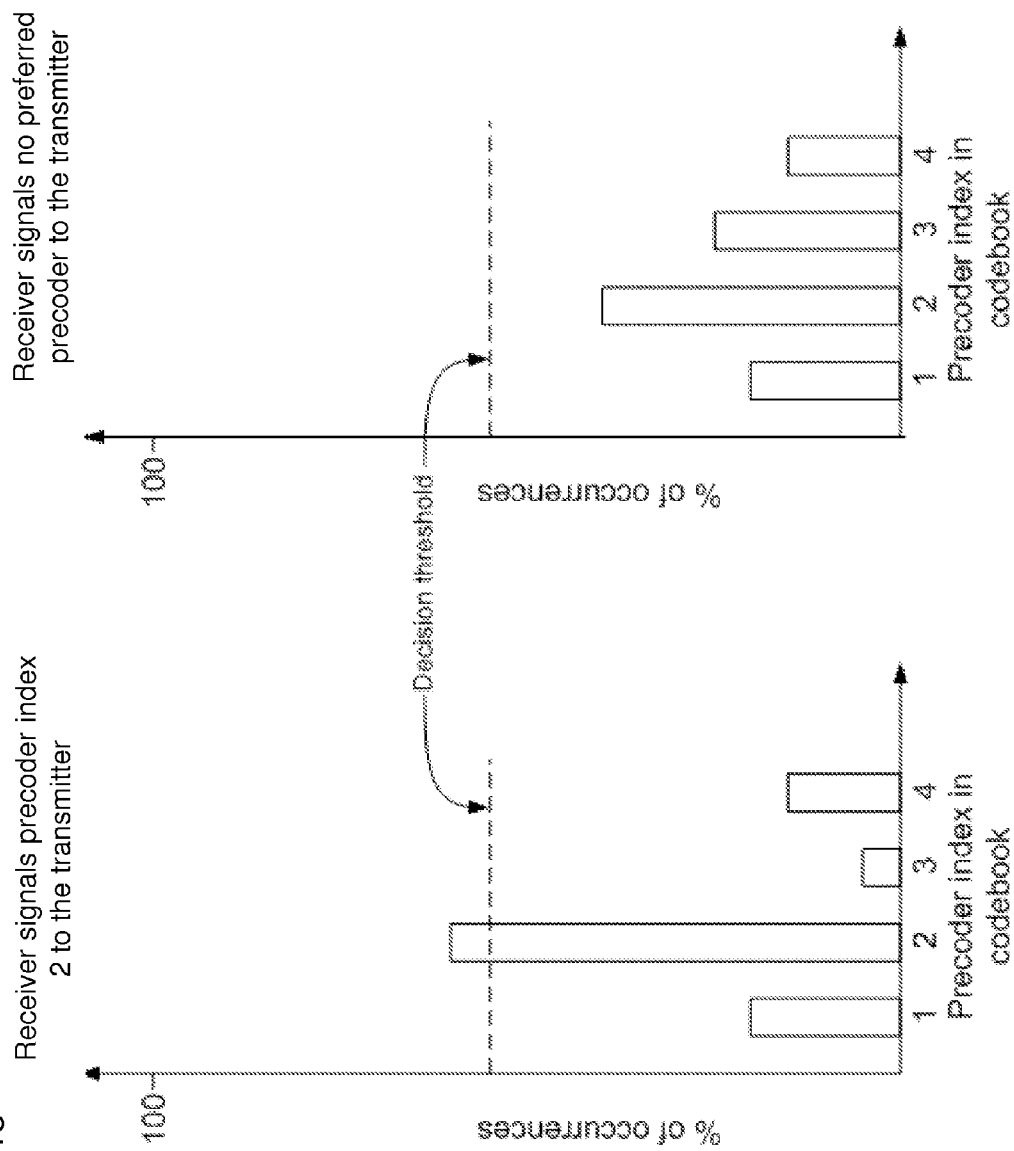
FIG. 13 is an exemplary precoder decision histogram with a predefined confidence level.

To limit the size of the report from the receiver 105, either only the preferred precoder may be reported (i.e. not reporting the confidence value of the selected precoder), or the receiver 105 may be set to only report a precoder, provided it has reached a certain minimum confidence value. This approach is shown in FIG. 13 where the decision threshold for the minimum confidence value is shown by a dashed line. Thus, the precoder index 2 is reported from the receiver 105 to the transmitter 101 in the case to the left in FIG. 13 because the decision threshold for precoder index 2 has been exceeded. No preferred precoder index is reported from the receiver 105 to the transmitter 101 in the case to the right in FIG. 13 because none of the precoder indexes has reached or exceeded the decision threshold. The minimum level of confidence value may either be specified in the specification or signaled to the receiver 105 in dedicated signaling, or in system information. The x-axis of the histograms in FIG. 13 represents the precoder index in the codebook and the y-axis represents the number of occurrence.

At step 1107 in FIG. 11, the receiver 105 has a decision on the preferred precoder to use, along with a value representing the confidence value. One or both of these two values may be reported back to the transmitter 101. For packet switched communication it may be reported in for example a modified Packet Downlink Ack/Nack (PDAN) message on the PACCH, or in a modified message of the Packet Timing Advance Control Channel (PTCCH), or the Piggybacked Ack/Nack report (PAN). In other exemplary embodiments a completely new message on an existing or new feedback channel may be used as is described in for example GP-091988, "Fast feedback channel (v1)", source Telefon AB LM Ericsson, ST-Ericsson SA. GERAN#44.

For Circuit Switched (CS) communications, the preferred precoder to use and the confidence value may be sent to the transmitter 101, for example, in a modified Slow Associated Control Channel (SACCH) that is transmitted on pre-defined data bursts every 480 ms, or in a modified Fast Associated Control Channel (FACCH) block transmitted for example with a pre-defined periodicity.

If using a pre-defined codebook, 3-4 bits may be sufficient to represent a precoder entry of said codebook, depending on the level of common understanding between the transmitter 101 and the receiver 105 regarding the number of Tx antennas 107 and the number of data layers being transmitted. The confidence value may be represented by 2-3 bits, representing the signaled precoder being the best choice for e.g. 0-25%, 25-50%, 50-75% and 75-100% of the time.

If a minimum level of confidence value is used to allow reporting of a preferred precoder as described in step 1105 of FIG. 11, the number of bits needed for reporting the confidence value may be omitted. This approach may be beneficial when using for example a fast feedback channel where the number of bits per user may be expected to be rather limited.

Some example embodiments will now be given first for packet switched communications and then for circuit switched communication. As known for a skilled person, circuit switching is a method which sets up a limited number of dedicated connections of constant bit rate and constant delay between nodes for exclusive use during the communication session. Circuit switching contrasts with packet switching which divides the data to be transmitted into packets transmitted through the network independently.

Packet Switched Communications

The transmitter 101 is here assumed to be equipped with four precoded Tx branches 107 transmitting two data layers to a receiver 105. Once every $8^{th}$ radioblock (represents every 20 ms for full buffers, two layers and four downlink timeslot multislot class) the transmitter 101 sends an unweighted data transmission that the receiver 105 may use to decide on a preferred precoder. After 25 of these transmissions (e.g. 500 ms) the receiver 105 sends a measurement report, pointing to a particular precoder that on average was considered better than the other alternatives, along with information on how frequent this decision was made. The transmitter 101 may now apply this precoder if the confidence value is seen as sufficient in its coming transmissions.

Circuit Switched Communications

The transmitter 101 is here assumed to be equipped with two precoded Tx branches 107 transmitting a single data layer of circuit switched speech service. The receiver 105 makes measurements on broadcasted unweighted transmissions, which during some circumstances may be done as often as once per TDMA frame (5 ms) but this rate of measurement is typically not needed. The receiver 105 may apply the averaging as described above and report every 480 ms along in a modified SACCH, or alternatively in a modified FACCH.

Changes to Legacy Quality Reporting

The legacy quality reporting used for EGPRS/EGPRS2 link adaptation is based on the use of a single data layer. This is considered when expanding to multiple data layers.

At the same time the number of bits available in quality reporting is limited and an extension of the quality parameters to report will have a negative impact on the size available for ack/nack reporting.

RXLEV/C_VALUE

The receiver 105 reports the link quality when instructed to do so by the transmitter 101. This report comprises, among other quantities, the received signal strength, quantized and mapped to 6 bits. This quantity is useful for the transmitter 101 for link adaptation and cell reselection and may be equally important for MIMO. But since the receiver 105 now has multiple receiver branches 110, this may be reported separately for each branch to make sure that each branch receives sufficient power.

Also, it may in some embodiments be useful with an indication to the transmitter 101 if the chosen precoder causes the layers to be imbalanced with regards to received signal strength, in which case the transmitter 101 may choose another precoder, reduce rank or adjust output power.

For MIMO in EGPRS/EGPRS2, different ways to expand signal strength reporting may be envisaged. Below are three exemplary options on how quality reporting may be done with several MIMO layers, without expanding the size of the report proportional to the number of layers used. The basic assumption used is that the MIMO layers will be transmitted and received with similar signal levels to maximize the channel capacity:

Option 1. Use the existing reporting mechanism to report the total power in all branches, alternatively the branch with the highest power. Do not report layer power imbalance.

Option 2. Report the branch with the highest power as today. Use for example two bits to describe the power difference to the branch with the lowest power. Do not report layer power imbalance.

Option 3. Report the total power in all branches alternatively the branch with the highest power, using six bits as today. Use for example two bits to describe the estimated power difference between the data layer with the highest power to the data layer with the lowest power. Do not report branch power imbalance.

The levels associated with each estimated power imbalance and power difference are advantageously pre-defined in the some specification, similar to the currently tabulated values of RXLEV.

To further reduce the size of the report, the six bit RXLEV value may be further reduced by using a reduced number of levels.

MEAN_BEP

The receiver 105 reports the link quality when instructed to do so by the transmitter 101. This report comprises, among other quantities, the mean bit error probability (MEAN_BEP) and the standard deviation of this value (CV_BEP), quantized and mapped to five and three bits, respectively. For EGPRS, both modulations are reported separately. For EGPRS2 the reporting is limited to two modulations. This quantity is useful for the transmitter 101 for link adaptation and may be equally important for MIMO. With multiple data layers the receiver 105 may provide independent reports for the layer because it may be useful for the transmitter 101 to receive independent reports for the layers to select Modulation and Coding Scheme (MCS) individually. However extending the current reporting to be used in each layer will extend the size of the quality reporting information element with a factor proportional to the number of MIMO layers used.

Below are three exemplary options on how to minimize the reporting size.

Option 1. Use the existing reporting mechanisms for EGPRS and EGPRS2, but the receiver 105 reports the average values from all layers to the transmitter 101.

Option 2. The receiver 105 only report the single most used modulation for the best and worst data layer to the transmitter 101. For EGPRS where only Gaussian Minimum Shift Keying (GMSK) and 8PSK is used, it is most probable that multi-layer transmission will be used in regions where 8PSK operates (medium/high C/I regions), and thus only reporting one modulation scheme should not cause noticeable restrictions compared to reporting two modulation schemes for all layers. GMSK is a form of modulation with no phase discontinuities used to provide data transmission with efficient spectrum usage. A C/I region refers to the different carrier to interferer regions in which the receiver operates.

Option 3. The receiver 105 reports the two most used modulations for the best and worst data layer, but compress the report by e.g. using only three bits for MEAN_BEP and one bit for CV_BEP per layer.

During a reporting period the transmission rank (number of layers transmitted) might change. This may e.g. be due to for example a reported rank preference from the receiver 105, or due to Uplink State Flag/Piggy Packed Ack/Nack (USF/PAN) multiplexing issues with legacy receivers, resulting in channel quality estimation of different rank for different modulation schemes. Similar to extending the channel quality reporting to different MIMO layers of a specific rank transmission, there might also be the need to extend the channel quality reporting to different rank transmissions during a reporting period. This may be performed in a way corresponding to adding additional layers to the reporting and the compression options described above may also be used in this scenario. For rank-1 transmission Option 1 reduces to no action, since only one layer is transmitted. A transmission rank is the actually transmitted number of data streams. The transmission rank may need to be adapted to suit the current channel characteristics and hence avoid excessive interstream interference.

For example, if a receiver 105 has received both rank-1 and rank-2 transmissions during a reporting period, the "layers" to be reported to the transmitter 101 may be: rank-1 transmissions, rank-2 transmission—layer1, rank-2 transmission—layer2.

Figure 14:
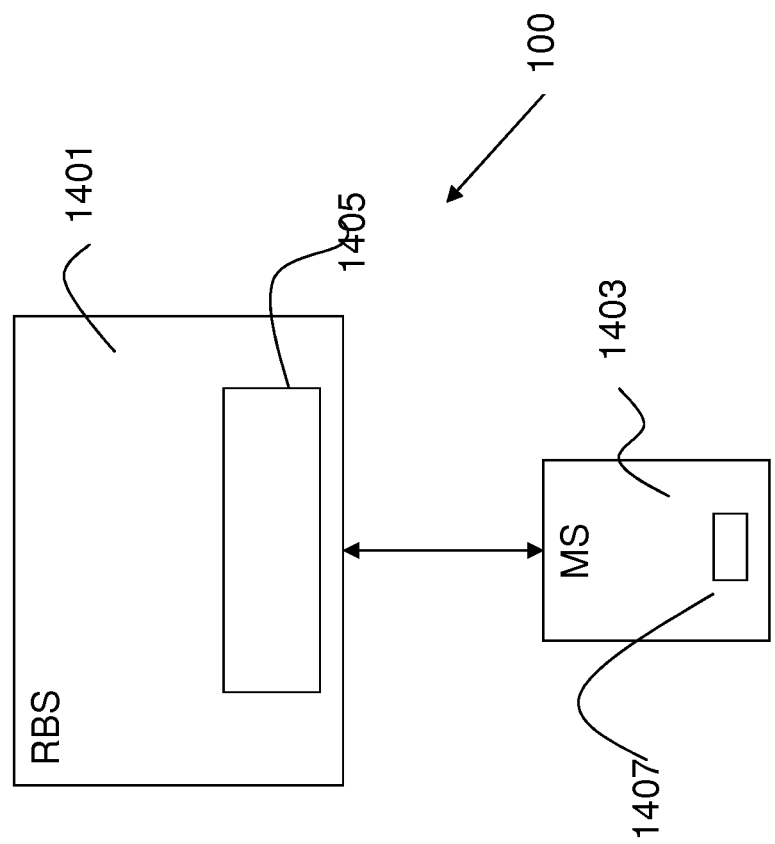
FIG. 14 is a general view of a radio system.

FIG. 14 illustrates an example where the system 100 in FIG. 1 is a GSM system. However it is also envisaged that the system may be another similar system. The system comprises a number of radio base stations 1401, whereof only one is shown for reasons of simplicity. The radio base station 1401 may be connected to by mobile stations (MSs) in the figure represented by the Mobile Station (MS) 1403 located in the area served by the radio base station 1401. In some embodiments, the radio base station 1401 corresponds to the transmitter 101 in FIG. 1 and the MS 1403 corresponds to the receiver 105 in FIG. 1. In other embodiments, the radio base station 1401 corresponds to the receiver 105 in FIG. 1 and the MS 1403 corresponds to the transmitter 101 in FIG. 1. The radio base station 1401 and the and the MS 1403 further comprise controllers/controller circuitry 1405, 1407 for providing functionality associated with the respective entities. The system is further configured to support MIMO as described herein. The controllers 1405, 1407 may for example comprise suitable hardware and or software. The hardware may comprise one or many processors that may be arranged to execute software stored in a readable storage media. The processor(s) may be implemented by a single dedicated processor, by a single shared processor, or by a plurality of individual processors, some of which may be shared or distributed. Moreover, a processor may include, without limitation, Digital Signal Processor (DSP) hardware, Application-Specific Integrated Circuit (ASIC) hardware, Read Only Memory (ROM), Random Access Memory (RAM), and/or other storage media. The processors 1405, 1407 provide for all the functionality associated with the respective entities 1401 and 1403.

Figure 15:
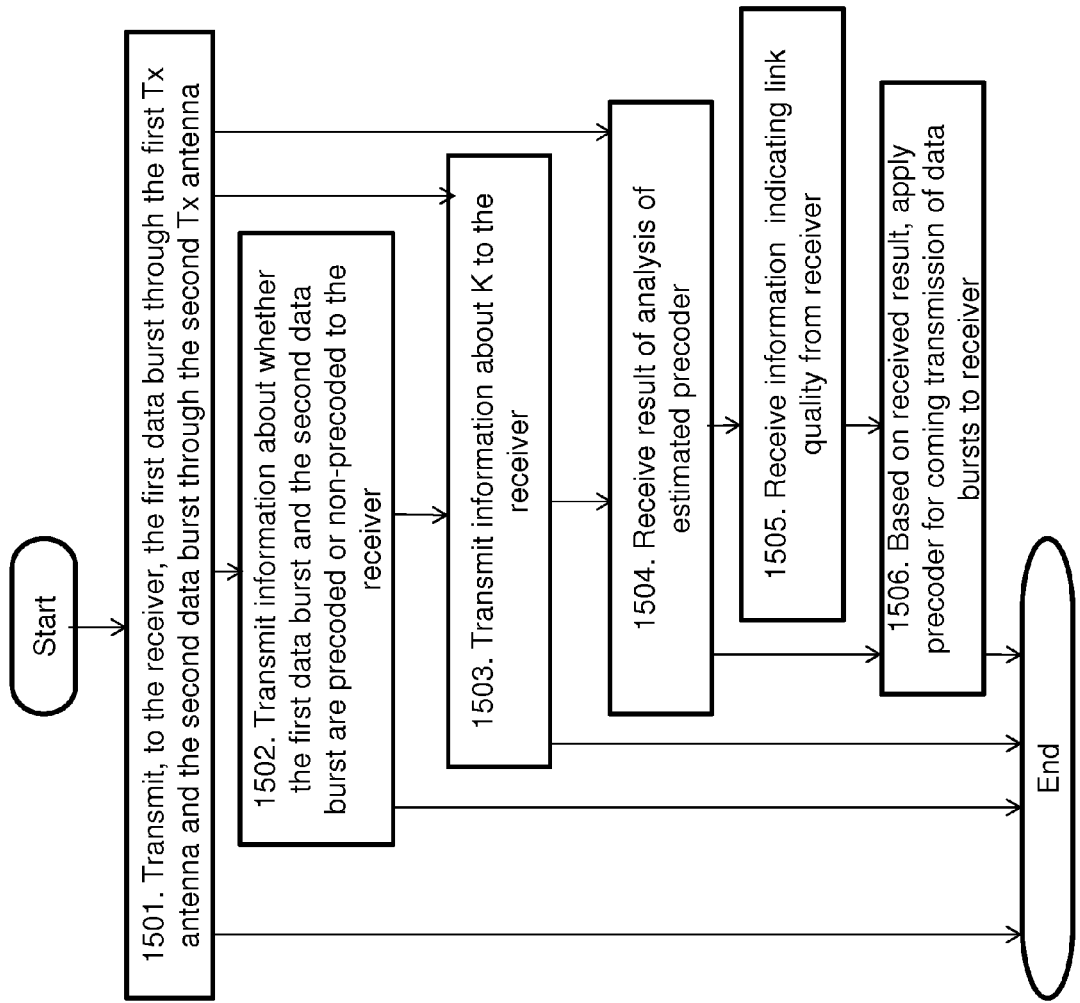
FIG. 15 is a flow chart illustrating embodiments of a method in a transmitter.

The method described above will now be described seen from the perspective of the transmitter 101. FIG. 15 is a flowchart describing the present method in the transmitter 101, for transmitting at least a first data burst and a second data burst to the receiver 105 in a system 100. The system is an EGPRS/EGPRS2 system. The system 100 applies closed loop codebook-based precoding MIMO. The transmitter 101 comprises at least a first Tx antenna 107a and a second Tx antenna 107b. In some embodiments, the transmitter 101 is represented by a base station and the receiver 105 is represented by a user equipment. In some embodiments, the transmitter 101 is represented by a user equipment and the receiver 105 is represented by a base station. The method comprises the following steps to be performed by the transmitter 101, which steps may be performed in any suitable order:

Step 1501

This step corresponds to step 202 in FIG. 2. The transmitter 101 transmits, to the receiver 105, the first data burst through the first Tx antenna 107a and the second data burst through the second Tx antenna 107b. The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

In some embodiments, the first training sequence, the second training sequence, the third training sequence and the fourth training sequence are associated with a respective rotation. In some embodiments, the first training sequence and the second training sequence are rotated with a first rotation angle and the third training sequence and the fourth training sequence are rotated with a second rotation angle. In some embodiments, the first training sequence and the second training sequence are obtained by rotating the third training sequence and the fourth training sequence. In some embodiments, the first data burst and the second data burst each further comprises user modulating code bits and tail bits.

In some embodiments, the precoded data burst and non-precoded data burst are alternately transmitted to the receiver 105. In some embodiments, the precoded data burst and the non-precoded data burst is alternated by transmitting the non-precoded data burst every $K^{th}$ TDMA frames. K may be a positive integer, and K may be constant or dynamically changed by transmitter 101.

Step 1502

This step corresponds to step 202 in FIG. 2. This is an optional step. In some embodiments, the transmitter 101 transmits, to the receiver 105, information about whether the first data burst and the second data burst are precoded or non-precoded. The information about whether the first data burst and the second data burst are precoded or non-precoded may be transmitted in an information element and/or using dedicated signalling and/or using dedicated in-band signalling and/or using implicit signalling.

Step 1503

This step corresponds to step 202 in FIG. 2. In some embodiments, the transmitter 101 transmits information about K to the receiver 105.

Step 1504

This step corresponds to step 205 in FIG. 2. The transmitter 101 receives a result of an analysis of an estimated preferred precoder from the receiver 105. The estimated preferred precoder is estimated by the receiver 105. The received result comprises at least one of an estimated preferred precoder index in the codebook and a confidence value. The confidence value indicates whether the preferred precoder is useful or not, i.e. whether it will actually improve the radio link performance. The precoder index may also be referred to as a precoder label and is an index or label of the preferred precoder in the codebook. It is not the actual precoder.

Step 1505

This step corresponds to step 205 in FIG. 2. The transmitter 101 receives information indicating a link quality from the receiver 101. The link quality comprises a received signal strength associated with the at least two Rx antennas 110 and a mean bit error probability associated with the at least two Rx antennas 110.

The transmitter 101 performs link adaptation based on the received information. This means choosing the best modulation and channel coding scheme. For example, if the radio link has poor quality more channel coding is used. This lowers the block error rates but at the same time lowers the throughput. If the link is good then not much error protection (channel coding) is needed in order to obtain low block error rates. The received information may influence the precoder selection, but indirectly. For example if the same precoder is used all the time but the bit error probability is very high the transmitter 101 may decide not to continue using the current precoder.

Step 1506

This step corresponds to step 206 in FIG. 2. Based on the received result, the transmitter 101 applies a precoder for coming transmissions of precoded data bursts to the receiver 101. The precoder is a preferred precoder estimated by the receiver 105 or a precoder selected by the transmitter 101.

In some instances (for example at very high speeds) the preferred precoder may be useless in the sense that using it does not improve the radio link performance. That is why a confidence value must be supplied together with the preferred precoder. In order to use fewer bits to signal the precoder, one may signal the preferred precoder only if it is certain that it is useful. In this case the confidence value need not be supplied (thus fewer bits are required) since the transmitter 101 knows that the signalled precoder is "good enough" and using it will improve system performance.

This applied precoder may be the one that is estimated by the receiver 105 or it may be another precoder, depending on the analysis. The precoder estimated by the receiver 105 need not be always the best choice, and the transmitter 101 may occasionally override the decision suggested by the receiver 105.

Figure 16:
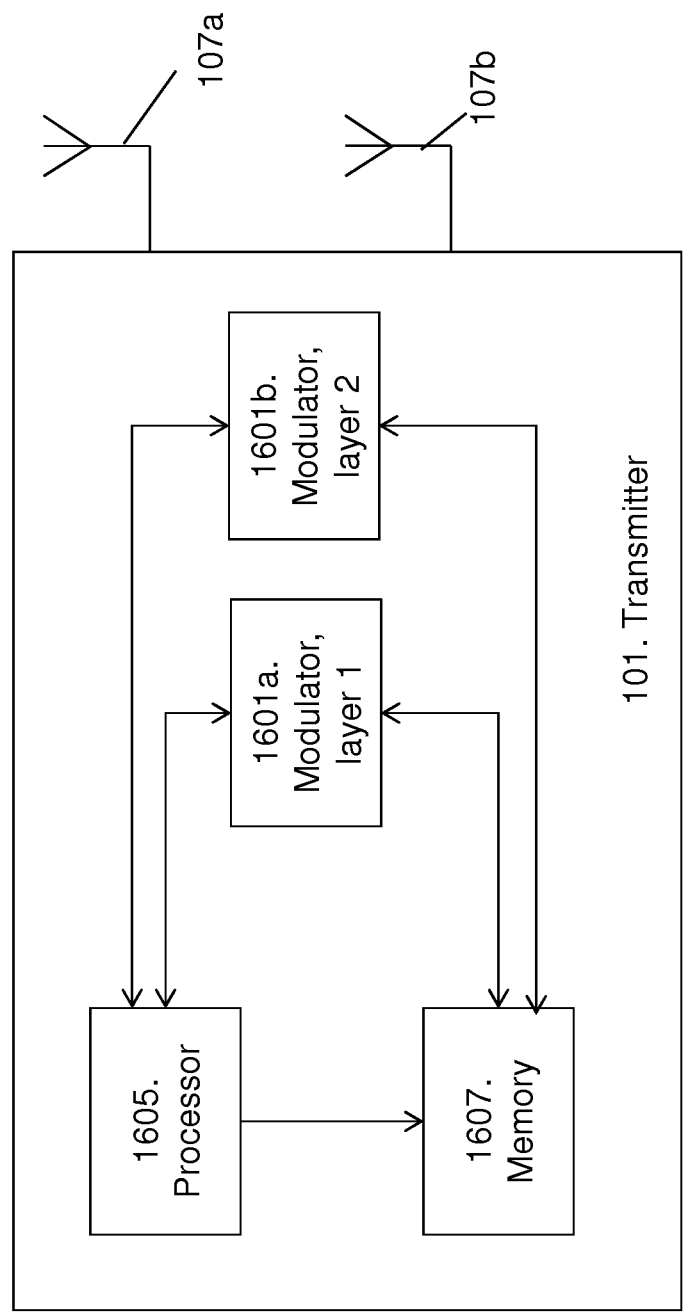
FIG. 16 is a schematic block diagram illustrating embodiments of a transmitter.

To perform the method steps shown in FIG. 15 for transmitting at least a first data burst and a second data burst to a receiver 105 in a system 100, the transmitter 101 comprises an arrangement as shown in FIG. 16. The system 100 is an EGPRS/EGPRS2 system and the system 100 applies closed loop codebook-based precoding MIMO. As mentioned above, the transmitter 101 comprises at least a first antenna 107a and a second Tx antenna 107b, each configured to transmit, to the receiver 105, at least the first data burst through the first Tx antenna 107a and the second data burst through the second Tx antenna 107b. The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

The first training sequence, the second training sequence, the third training sequence and the fourth training sequence may be associated with a respective rotation. The first training sequence and the second training sequence may be rotated with a first rotation angle and wherein the third training sequence and the fourth training sequence may be rotated with a second rotation angle. In some embodiments, the first training sequence and the second training sequence are obtained by rotating the third training sequence and the fourth training sequence. In some embodiments, the first data burst and the second data burst each further comprises user modulating code bits and tail bits. The transmitter 101 comprises a modulator for layer 1 1601a and a modulator for layer 2 1601b which perform the rotations. Further details of the modulators 1601a and 1601b are seen in FIG. 3.

In some embodiments, the transmitter 101 is further configured to transmit information about whether the first data burst and the second data burst are precoded or non-precoded to the receiver 105. The information about whether the first data burst and the second data burst are precoded or non-precoded may be transmitted in an information element and/or using dedicated signalling and/or using dedicated in-band signalling and/or using implicit signalling.

In some embodiments, the precoded data burst and non-precoded data burst are alternately transmitted to the receiver 105. The precoded data burst and the non-precoded data burst may be alternated by transmitting the non-precoded burst every $K^{th}$ TDMA frames. K may be a positive integer and K may be constant or dynamically changed by transmitter 101.

The transmitter 101 may be further configured to transmit information about K to the receiver 105.

The transmitter 101 may be represented by a base station and the receiver 105 may be represented by a user equipment, or the transmitter 101 may be represented by a user equipment and the receiver 105 may be represented by a base station.

In some embodiments, the transmitter 101 is further configured to receive a result of an analysis of an estimated preferred precoder from the receiver 105. The estimated preferred precoder is estimated by the receiver 105. The received result comprises at least one of an estimated preferred precoder index in the codebook and a confidence value.

In some embodiments, the transmitter 101 is further configured to receive information indicating a link quality from the receiver 101. The link quality comprises a received signal strength associated with the at least two Rx antennas 110 and a mean bit error probability associated with the at least two Rx antennas 110.

The transmitter 101 may further comprise a processor 1605 which is configured to apply, based on the received result, a precoder for coming transmissions of precoded data bursts to the receiver 101. The precoder is a preferred precoder estimated by the receiver 105 or a precoder selected by the transmitter 101.

The transmitter 101 may further comprise a memory 1607 comprising one or more memory units. The memory 1107 is arranged to be used to store data, received data streams, power level measurements, first and second data bursts, training sequences, rotation angles, threshold values, time periods, configurations, schedulings, and applications to perform the methods herein when being executed in the transmitter 101.

It should be noted that the link between the units comprised in the transmitter 101, even though not explicitly illustrated in FIG. 16, may be of any suitable kind comprising either a wired or wireless link, as understood by the person skilled in the art.

Those skilled in the art will also appreciate that the transmitter 101 may refer to a combination of analog and digital circuits, and/or one or more processors configured with software and/or firmware, e.g. stored in the memory 1607, that when executed by the one or more processors such as the processor 1605.

Figure 17:
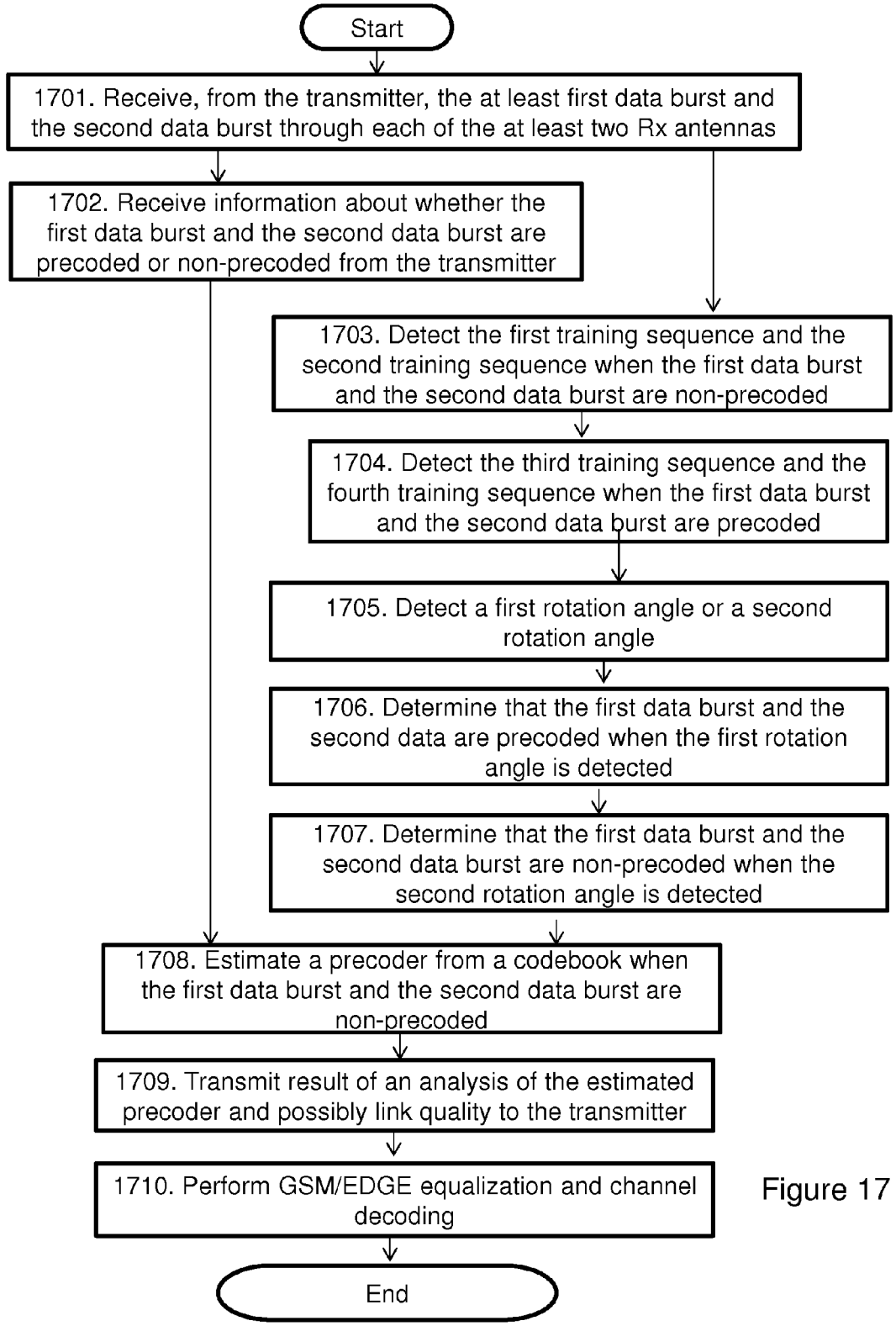
FIG. 17 is a flow chart illustrating embodiments of a method in a receiver.

The method described above will now be described seen from the perspective of the receiver 105. FIG. 17 is a flowchart describing the present method in the receiver 105, for receiving at least a first data burst and a second data burst from a transmitter 101 in a system 100. The system is an EGPRS/EGPRS2 system and applies closed loop codebook-based precoding MIMO. The receiver 105 comprises at least two Rx antennas 110. In some embodiments, the transmitter 101 is represented by a base station and the receiver 105 is represented by a user equipment, or the transmitter 101 is represented by a user equipment and the receiver 105 is represented by a base station. The method comprises the following steps, which steps may be performed in any suitable order:

Step 1701

This step corresponds to step 202 in FIG. 2. The receiver 105 receives, from the transmitter 101, the at least first data burst and the second data burst through each of the at least two Rx antennas 110. The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

The first training sequence, the second training sequence, the third training sequence and the fourth training sequence may be associated with a respective rotation. In some embodiments, the first training sequence and the second training sequence are rotated with a first rotation angle, and the third training sequence and the fourth training sequence are rotated with a second rotation angle. In some embodiments, the first training sequence and the second training sequence are obtained by rotating the third training sequence and the fourth training sequence.

In MIMO there are at least two independent data streams. So there are at least two data bursts. Each data burst has its own training sequence, and the training sequences are always different (orthogonal).

The receiver 105 may detect two or more rotation angles. The following table shows the possible rotation angles for each layer, depending on the modulation.

TABLE 2

| Modulation | With precoding | Without precoding |
|---|---|---|
| 8PSK | Rotation angle 1 | Rotation angle 2 |
| 16QAM | Rotation angle 3 | Rotation angle 4 |
| 32QAM | Rotation angle 5 | Rotation angle 6 |

The left column comprises the different modulations, the middle column of table 2 comprises the rotation angles with precoding and the right column comprises the rotation angles without precoding.

Now, layer 1 may use any modulation and layer 2 may use any modulation, and the receiver 105 does not know which one is used. So the receiver 105 must detect the rotation angle in each layer and then take a decision. For example when the receiver 105 detects angle 1 in layer 1 and angle 5 in layer 2 then it determines that precoding is used and that layer 1 uses 8PSK modulation and layer 2 uses 32QAM modulation. When it detects angle 1 in layer 1 and angle 2 in layer 2 then these may not possibly be the correct rotation angles (because either all layers are precoded or not) but the receiver 105 must still make a decision.

A rotation generates new training symbols from existing training symbols, known both by the transmitter 101 and the receiver 105. But new training symbols (not necessarily obtained by rotation of an existing training sequence) may as well be used. Note also that the training sequence bits are mapped to symbols and then different training sequence symbols are obtained by applying different rotations. So a plurality different training sequence symbols may be obtained from one set of training bits. In the embodiments herein, different training sequence symbols are needed in order to distinguish precoding from non-precoding. The different training symbols may be obtained from the same training sequence bits or from different training sequence bits.

Step 1702

This step corresponds to step 202 in FIG. 2. In some embodiments, the receiver 105 receives, from the transmitter 101, information about whether the first data burst and the second data burst are precoded or non-precoded. The information about whether the first data burst and the second data burst are precoded or non-precoded may be received in an information element and/or via dedicated signalling and/or via dedicated in-band signalling and/or via implicit signalling.

Step 1703

This step corresponds to step 203 in FIG. 2. In some embodiments, the receiver 105 detects the first training sequence and the second training sequence, when the first data burst and the second data burst are non-precoded. The receiver 105 has earlier received an encoded piece of information about what kind of training sequence will be transmitted, and is therefore able to detect that it is received.

Step 1704

This step corresponds to step 203 in FIG. 2. In some embodiments, the receiver 105 detects the third training sequence and the fourth training sequence when the first data burst and the second data burst are precoded.

Step 1705

This step corresponds to step 203 in FIG. 2. In some embodiments, the receiver 105 detects a first rotation angle or a second rotation angle. The first training sequence and the second training sequence is rotated with the first rotation angle and the third training sequence and the fourth training sequence is rotated with the second rotation angle. In some embodiments, the receiver 105 knows that there are several layers.

Step 1706

This step corresponds to step 203 in FIG. 2. In some embodiments, the receiver 105 determines that the first data burst and the second data are precoded when the first rotation angle is detected.

Step 1707

This step corresponds to step 203 in FIG. 2. In some embodiments, the receiver 105 determines that the first data burst and the second data burst are non-precoded when the second rotation angle is detected.

Step 1708

This step corresponds to step 204 in FIG. 2 and to steps 1101, 1103, 1105 in FIG. 11. In some embodiments, the receiver 105 estimates a precoder from a codebook when the first data burst and the second data burst are non-precoded. The estimate is based on statistics of a plurality of data bursts. The statistics may relate to at least one of a received signal strength, an estimated signal-to-noise ratio and a bit error rate. The estimating may be performed on a data burst(s) intended for the receiver 105 or intended for another receiver.

Step 1709

This step corresponds to step 205 in FIG. 2 and to step 1107 in FIG. 11. In some embodiments, the receiver 105 transmits a result of an analysis of the estimated precoder to the transmitter 101. The result comprises at least one of an estimated preferred precoder index in the codebook and a confidence value.

In some embodiments, the receiver 105 transmits information indicating a link quality to the transmitter 101. The link quality comprises a received signal strength associated with the at least two Rx antennas 110 and a mean bit error probability associated with the at least two Rx antennas 110.

Step 1710

In some embodiments, the receiver 105 performs EGPRS/EGPRS2 equalization and channel decoding.

Figure 18:
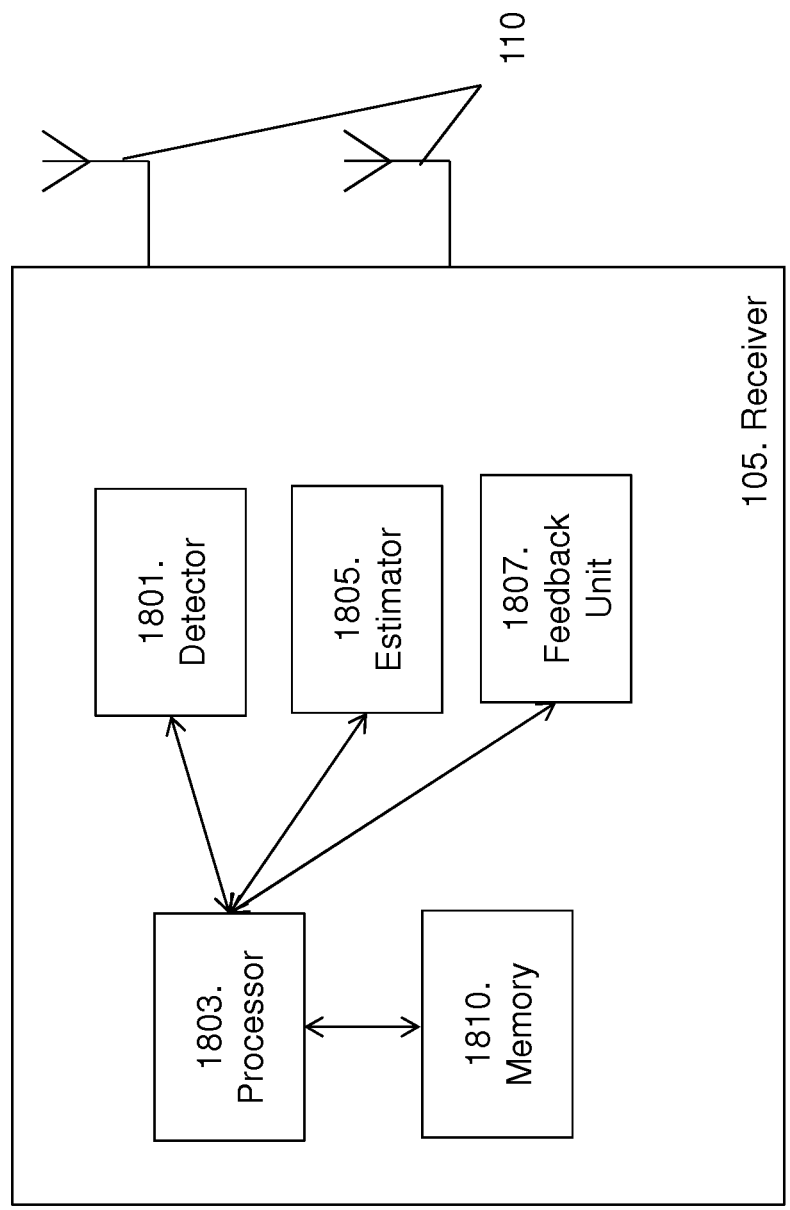
FIG. 18 is a schematic block diagram illustrating embodiments of a receiver.

To perform the method steps shown in FIG. 17 for receiving at least a first data burst and a second data burst from a transmitter 101 in a system 100, the receiver 105 comprises an arrangement as shown in FIG. 18. The system 100 is an EGPRS/EGPRS2 system and applies closed loop codebook-based precoding MIMO. As mentioned above, the receiver 105 comprises at least two Rx antennas 110, each configured to receive, from the transmitter 101, the at least first data burst and the second data burst through each of the at least two Rx antennas 110. The first data burst comprises a first training sequence and the second data burst comprises a second training sequence when the first data burst and the second data burst are non-precoded. The first data burst comprises a third training sequence and the second data burst comprises a fourth training sequence when the first data burst and the second data burst are precoded.

In some embodiments, the first training sequence, the second training sequence, the third training sequence and the fourth training sequence are associated with a respective rotation. In some embodiments, the first training sequence and the second training sequence are rotated with a first rotation angle and the third training sequence and the fourth training sequence are rotated with a second rotation angle. In some embodiments, the first training sequence and the second training sequence are obtained by rotating the third training sequence and the fourth training sequence.

In some embodiments, the receiver 105 is further configured to receive information about whether the first data burst and the second data burst are precoded or non-precoded from the transmitter 101. The information about whether the first data burst and the second data burst are precoded or non-precoded may be received in an information element and/or via dedicated signalling and/or via dedicated in-band signalling and/or via implicit signalling.

In some embodiments, the receiver 105 comprises a detector 1801 configured to detect the first training sequence and the second training sequence when the first data burst and the second data burst are non-precoded, and to detect the third training sequence and the fourth training sequence when the first data burst and the second data burst are precoded. In some embodiments, the detector 1801 is further configured to detect a first rotation angle or a second rotation angle. The first training sequence and the second training sequence may be rotated with the first rotation angle and the third training sequence and the fourth training sequence may be rotated with the second rotation angle.

In some embodiments, the receiver 105 comprises a processor 1803 which is configured to determine that the first data burst and the second data are precoded when the first rotation angle is detected, and to determine that the first data burst and the second data burst are non-precoded when the second rotation angle is detected. The processor 1803 may be configured to perform EGPRS/EGPRS2 equalization and channel decoding.

In some embodiments, the receiver 105 comprises an estimator 1805 configured to estimate a preferred precoder from a codebook when the first data burst and the second data burst are non-precoded. The estimate is based on statistics of a plurality of data burst. The statistics relates to at least one of a received signal strength, an estimated signal-to-noise ratio and a bit error rate. The estimating is performed on a data burst(s) intended for the receiver 105 or intended for another receiver.

In some embodiments, the receiver 105 comprises a feedback unit 1807 configured to transmit a result of an analysis of the estimated preferred precoder to the transmitter 101. The result comprises at least one of an estimated preferred precoder index in the codebook and a confidence value. The feedback unit 1807 is further configured to transmit information indicating a link quality to the transmitter 101. The link quality comprises a received signal strength associated with the at least two Rx antennas 110 and a mean bit error probability associated with the at least two Rx antennas 110.

The transmitter 101 may be represented by a base station and the receiver 105 may be represented by a user equipment, or the transmitter 101 may be represented by a user equipment and the receiver 105 may be represented by a base station.

The receiver 105 may further comprise a memory 1810 comprising one or more memory units. The memory 1810 is arranged to be used to store data, received data streams, power level measurements, first and second data bursts, training sequences, rotation angles, threshold values, time periods, configurations, schedulings, and applications to perform the methods herein when being executed in the receiver 105.

Those skilled in the art will also appreciate that the receiver 105 may refer to a combination of analog and digital circuits, and/or one or more processors configured with software and/or firmware, e.g. stored in the memory 1810, that when executed by the one or more processors such as the processor 1803 perform as described above.

It should be noted that the link between the units comprised in the receiver 105, even though not explicitly illustrated in FIG. 18, may be of any suitable kind comprising either a wired or wireless link, as understood by the person skilled in the art.

The present mechanism for transmitting at least a first data burst and a second data burst to a receiver 105 in the system 100 may be implemented through one or more processors, such as a processor 1605 in the transmitter arrangement depicted in FIG. 16 and a processor 1801 in the receiver arrangement depicted in FIG. 18, together with computer program code for performing the functions of the embodiments herein. The processor may be for example a DSP, ASIC processor, Field-programmable gate array (FPGA) processor or microprocessor. The program code mentioned above may also be provided as a computer program product, for instance in the form of a data carrier carrying computer program code for performing the embodiments herein when being loaded into the transmitter 101 and/or receiver 105. One such carrier may be in the form of a CD ROM disc. It is however feasible with other data carriers such as a memory stick. The computer program code may furthermore be provided as pure program code on a server and downloaded to the transmitter 101 and/or receiver 105.

The embodiments herein also extend to a MS and a radio network node, such as a radio base station (RBS) arranged to perform the above methods. The MS/RBS may be provided with a controller/controller circuitry for performing the above methods. The controller(s) may be implemented using suitable hardware and or software. The hardware may comprise one or many processors that may be arranged to execute software stored in a readable storage media. The processor(s) may be implemented by a single dedicated processor, by a single shared processor, or by a plurality of individual processors, some of which may be shared or distributed. Moreover, a processor may include, without limitation, DSP hardware, ASIC hardware, ROM, RAM, and/or other storage media.

MIMO technologies are very important in modern wireless communications systems because they offer the possibility to increase spectrum efficiency and peak rates. Multi-user MIMO had already been standardized in GSM, in the feature called VAMOS. This technique addresses only circuit switched speech services. Recently, single user MIMO for EGRPS was proposed as a way to evolve the GSM/EDGE radio access network. The embodiments herein introduce MIMO transmission and reception techniques for an evolved GSM/EDGE air interface supporting MIMO.

The embodiments herein pertains EGPRS/EGPRS2 in MIMO mode. MIMO for EGPRS has been proposed initially in the downlink only. However, MIMO EGPRS/EGRPS2 may be used as well in the uplink. The embodiments herein described below may be applied in both the uplink and downlink. The embodiments herein address transmission and reception techniques for multiple antenna transmitters 107 and multiple antenna receivers 110 in an EGPRS/EGPRS2 system 100. The embodiments herein are related to layer 1.

The embodiments herein relates to a closed loop MIMO concept for EGPRS/EGPRS2. Unlike LTE, it does not rely on fast feedback. It exploits the fact for a given data transmission, there may be preferred phases/amplitudes of the transmitted signals that give gains over fixed or random phases, over time periods much larger than the coherence time of the channel. Since the time periods over which the phases/amplitudes are kept constant are of the order of a few seconds, the latency of EGPRS/EGPRS2 does not prevent the receiver 105 to provide useful feedback to the transmitter 101.

The characteristics of the radio channel between the transmitter 101 and receiver 105 may be modified from data burst to data burst by using different precoding matrices. Codebook based precoding, similar to that used in LTE, is employed. Not all data bursts are precoded. At the receiver 105 side, the receiver 105 blindly detects the use of precoding by detecting the rotation of the training sequences. Some rotations are used for precoded data bursts and a different set of rotations are used for non-precoded data bursts. Alternatively, the TDMA frame numbers when precoding is used/not used are signaled by the transmitter 101 (that is, by the network in downlink transmissions) to the receiver 105. When a data burst is not precoded, the receiver 105 may estimate the preferred precoding matrix among the finite set of precoding matrices in the codebook. The receiver 105 feeds back long term statistics of the estimated precoder to the transmitter 101, in a way compatible with existing mechanisms for feedback.

With the embodiments herein it is possible to achieve link-level gains by selecting a preferred precoder that adapts to the average channel conditions. For periods in the order of a second or more, one specific precoder is expected to be significantly better than the others of a pre-defined codebook, or compared to using a fixed or random phases over time. This reporting interval may be more in line with the reporting principles of current EGPRS.

In accordance with some embodiments, instead of the fast reporting of LTE and HSPA, the receiver may be configured to report the preferred precoder out of statistics gathered over a longer period of time as determined based on some preset condition. The preferred long-term precoder may be provided along with a confidence value that describes how much better this preferred precoder is compared to the other entries of a pre-defined codebook. The report may be sent to a node of the cellular network. The node, such as a radio base station, may use the reported information in MIMO transmission, thereby improving the MIMO transmission.

The receiver 105 is in accordance with some embodiment configured to determine the preferred precoder e.g. based on re-occurring unweighted (non-precoded) transmissions from the transmitter 101.

The methods of reporting a preferred precoder by the receiver 105 may be applied whenever the transmitter 101 in an EGPRS/EGPRS2 network utilizes spatial multiplexing and/or beamforming.

For the sake of clarity the embodiments herein is described for 2×2 MIMO, but extensions to a larger number of layers are straightforward.

Using the methods and devices as described herein will enable closed loop MIMO precoding techniques and beamforming techniques to be applied in GSM without requiring the fast feedback of LTE and HSPA. Hereby introduction of closed loop MIMO and closed loop beamforming in GSM is made possible without requiring an extensive overhaul of the GSM/EDGE air interface.

It should be noted that the reported quantities as described herein are based on a long term preferred precoder statistics and are therefore different from the short term statistics of e.g. LTE such as CQI, RI and PMI.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear.

The invention claimed is:

1. A method in a transmitter for transmitting at least a first data burst and a second data burst to a receiver in a system,
    wherein the system is an Enhanced General Packet Radio Service/Enhanced General Packet Radio Service 2, EGPRS/EGRPS2, system,
    wherein the system applies closed loop codebook-based precoding Multiple Input Multiple Output, MIMO, and
    wherein the transmitter comprises at least a first transmission, Tx, antenna and a second Tx antenna,
the method comprising:
    transmitting, to the receiver, the first data burst through the first Tx antenna and the second data burst through the second Tx antenna, wherein the first data burst comprises a first training sequence and the second data burst comprises a second training sequence when the first data burst and the second data burst are non-precoded, and
    wherein the first data burst comprises a third training sequence and the second data burst comprises a fourth training sequence when the first data burst and the second data burst are precoded.

2. The method according to claim 1, wherein the first training sequence, the second training sequence, the third training sequence and the fourth training sequence are each associated with a respective rotation.

3. The method according to claim 1, wherein the first training sequence and the second training sequence are rotated with a first rotation angle, and wherein the third training sequence and the fourth training sequence are rotated with a second rotation angle.

4. The method according to claim 1, wherein the first training sequence and the second training sequence are obtained by rotating the third training sequence and the fourth training sequence.

5. The method according to claim 1, wherein the precoded data bursts and non-precoded data burst are alternately transmitted to the receiver, wherein the precoded data burst and the non-precoded data bursts is alternated by transmitting the non-precoded burst every Kth Time Division Multiple Access, TDMA, frames, wherein K is a positive integer, and wherein K is constant or dynamically changed by transmitter.

6. The method according to claim 5, further comprising transmitting information about K to the receiver.

7. The method according to claim 1, further comprising:
    transmitting information about whether the first data burst and the second data burst are precoded or non-precoded to the receiver, and
    wherein the information about whether the first data burst and the second data burst are precoded or non-precoded is transmitted in an information element and/or via dedicated signalling and/or via dedicated in-band signalling and/or via implicit signalling.

8. The method according to claim 1, further comprising:
    receiving a result of an analysis of an estimated preferred precoder from the receiver,
    wherein the estimated preferred precoder is estimated by the receiver, and
    wherein the received result comprises at least one of an estimated preferred precoder index in the codebook and a confidence value.

9. The method according to claim 8, further comprising:
    based on the received result, applying a precoder for coming transmissions of precoded data bursts to the receiver, which precoder is a preferred precoder estimated by the receiver or a precoder selected by the transmitter.

10. The method according to claim 1, further comprises:
    receiving information indicating a link quality from the receiver, which link quality comprises a received signal strength associated with the at least two Rx antennas and a mean bit error probability associated with the at least two Rx antennas.

11. A method in a receiver for receiving at least a first data burst and a second data burst from a transmitter in a system,
    wherein the system is an Enhanced General Packet Radio Service/Enhanced General Packet Radio Service 2, EGPRS/EGRPS2, system,
    wherein the system applies closed loop codebook-based precoding Multiple Input Multiple Output, MIMO, and
    wherein the receiver comprises at least two receiver, Rx, antennas, the method comprising:

receiving, from the transmitter, the at least first data burst and the second data burst through each of the at least two Rx antennas,
wherein the first data burst comprises a first training sequence and the second data burst comprises a second training sequence when the first data burst and the second data burst are non-precoded, and
wherein the first data burst comprises a third training sequence and the second data burst comprises a fourth training sequence when the first data burst and the second data burst are precoded.

12. The method according to claim 11, wherein the first training sequence, the second training sequence, the third training sequence and the fourth training sequence are each associated with a respective rotation.

13. The method according to claim 11, wherein the first training sequence and the second training sequence are rotated with a first rotation angle and wherein the third training sequence and the fourth training sequence are rotated with a second rotation angle.

14. The method according to claim 11, wherein the first training sequence and the second training sequence are obtained by rotating the third training sequence and the fourth training sequence.

15. The method according to claim 11, further comprising:
receiving information about whether the first data burst and the second data burst are precoded or non-precoded from the transmitter,
wherein the information about whether the first data burst and the second data burst are precoded or non-precoded is received in an information element and/or via dedicated signalling and/or via dedicated in-band signalling and/or via implicit signalling.

16. The method according to claim 11, further comprising:
detecting the first training sequence and the second training sequence, when the first data burst and the second data burst are non-precoded; and
detecting the third training sequence and the fourth training sequence when the first data burst and the second data burst are precoded.

17. The method according to claim 11, further comprising:
detecting a first rotation angle or a second rotation angle, wherein the first training sequence and the second training sequence is rotated with the first rotation angle and wherein the third training sequence and the fourth training sequence is rotated with the second rotation angle;
determining that the first data burst and the second data burst are precoded when the first rotation angle is detected; and
determining that the first data burst and the second data burst are non-precoded when the second rotation angle is detected.

18. The method according to claim 11, further comprising:
estimating a preferred precoder from a codebook when the first data burst and the second data burst are non-precoded, wherein the estimate is based on statistics of a plurality of data bursts; and
transmitting a result of an analysis of the estimated preferred precoder to the transmitter, wherein the result comprises at least one of an estimated preferred precoder index in the codebook and a confidence value.

19. The method according to claim 18, wherein the statistics relates to at least one of a received signal strength, an estimated signal-to-noise ratio and a bit error rate.

20. The method according to claim 18, wherein the estimating is performed on a data burst(s) intended for the receiver or intended for another receiver.

21. The method according to claim 11, further comprises:
transmitting information indicating a link quality to the transmitter, which link quality comprises a received signal strength associated with the at least two Rx antennas and a mean bit error probability associated with the at least two Rx antennas.

22. A transmitter for transmitting at least a first data burst and a second data burst to a receiver in a system, wherein the system is an Enhanced General Packet Radio Service/Enhanced General Packet Radio Service 2, EGPRS/EGRPS2, system, wherein the system applies closed loop codebook-based precoding Multiple Input Multiple Output, MIMO, the transmitter comprising:
at least a first transmission, Tx, antenna; and a second Tx antenna, and
wherein the transmitter is configured to transmit, to the receiver, the first data burst through the first Tx antenna and the second data burst through the second Tx antenna,
wherein the first data burst comprises a first training sequence and the second data burst comprises a second training sequence when the first data burst and the second data burst are non-precoded, and
wherein the first data burst comprises a third training sequence and the second data burst comprises a fourth training sequence when the first data burst and the second data burst are precoded.

23. The transmitter according to claim 11, wherein the first training sequence, the second training sequence, the third training sequence and the fourth training sequence are each associated with a respective rotation.

24. The transmitter according to claim 22, wherein the first training sequence and the second training sequence are rotated with a first rotation angle, and wherein the third training sequence and the fourth training sequence are rotated with a second rotation angle.

25. The transmitter according to claim 22, wherein the first training sequence and the second training sequence are obtained by rotating the third training sequence and the fourth training sequence.

26. The transmitter according to claim 22, wherein the precoded data burst and non-precoded data burst are alternately transmitted to the receiver, and wherein the precoded data burst and the non-precoded data burst is alternated by transmitting the non-precoded burst every Kth Time Division Multiple Access, TDMA, frames, wherein K is a positive integer, and wherein K is constant or dynamically changed by transmitter.

27. The transmitter according to claim 26, further configured to transmit information about K to the receiver.

28. The transmitter according to claim 22, further configured to transmit information about whether the first data burst and the second data burst are precoded or non-precoded to the receiver, and wherein the information about whether the first data burst and the second data burst are precoded or non-precoded is transmitted in an information element and/or via dedicated signalling and/or via dedicated in-band signalling and/or via implicit signalling.

29. The transmitter according to claim 22, further configured to receive a result of an analysis of an estimated preferred precoder from the receiver, wherein the estimated preferred precoder is estimated by the receiver, and wherein the received result comprises at least one of an estimated preferred precoder index in the codebook and a confidence value.

30. The transmitter according to claim 29, further comprising:

a processor configured to apply, based on the received result, a precoder for coming transmissions of precoded data bursts to the receiver, which precoder is a preferred precoder estimated by the receiver or a precoder selected by the transmitter.

31. The transmitter according to claim 22, further configured to receive information indicating a link quality from the receiver, which link quality comprises a received signal strength associated with the at least two Rx antennas and a mean bit error probability associated with the at least two Rx antennas.

32. A receiver for receiving at least a first data burst and a second data burst from a transmitter in a system, wherein the system is an Enhanced General Packet Radio Service/Enhanced General Packet Radio Service 2, EGPRS/EGRPS2, system, wherein the system applies closed loop codebook-based precoding Multiple Input Multiple Output, MIMO, the receiver comprising:

at least two receiver, Rx, antennas, wherein
the receiver is configured to receive, from the transmitter, the at least first data burst and the second data burst through each of the at least two Rx antennas,
wherein the first data burst comprises a first training sequence and the second data burst comprises a second training sequence when the first data burst and the second data burst are non-precoded, and
wherein the first data burst comprises a third training sequence and the second data burst comprises a fourth training sequence when the first data burst and the second data burst are precoded.

33. The receiver according to claim 32, wherein the first training sequence, the second training sequence, the third training sequence and the fourth training sequence are each associated with a respective rotation.

34. The receiver according to claim 32, wherein the first training sequence and the second training sequence are rotated with a first rotation angle, and wherein the third training sequence and the fourth training sequence are rotated with a second rotation angle.

35. The receiver according to claim 32, wherein the first training sequence and the second training sequence are obtained by rotating the third training sequence and the fourth training sequence.

36. The receiver according to claim 32, further configured to receive information about whether the first data burst and the second data burst are precoded or non-precoded from the transmitter, and wherein the information about whether the first data burst and the second data burst are precoded or non-precoded is received in an information element and/or via dedicated signalling and/or via dedicated in-band signalling and/or via implicit signalling.

37. The receiver according to claim 32, further comprising:
a detector configured to:
detect the first training sequence and the second training sequence, when the first data burst and the second data burst are non-precoded; and to
detect the third training sequence and the fourth training sequence when the first data burst and the second data burst are precoded.

38. The receiver according to claim 32, further comprising:
a detector configured to detect a first rotation angle or a second rotation angle, wherein the first training sequence and the second training sequence is rotated with the first rotation angle and wherein the third training sequence and the fourth training sequence is rotated with the second rotation angle;
a processor configured to:
determine that the first data burst and the second data burst are precoded when the first rotation angle is detected; and to
determine that the first data burst and the second data burst are non-precoded when the second rotation angle is detected.

39. The receiver according to claim 32, further comprising:
an estimator configured to estimate a preferred precoder from a codebook when the first data burst and the second data burst are non-precoded, wherein the estimate is based on statistics of a plurality of data bursts; and
a feedback unit configured to transmit a result of an analysis of the estimated preferred precoder to the transmitter, wherein the result comprises at least one of an estimated preferred precoder index in the codebook and a confidence value.

40. The receiver according to claim 39, wherein the statistics relates to at least one of a received signal strength, an estimated signal-to-noise ratio and a bit error rate.

41. The receiver according to claim 39, wherein the estimating is performed on a data burst(s) intended for the receiver or intended for another receiver.

42. The receiver according to claim 32, further comprising:
a feedback unit configured to transmit information indicating a link quality to the transmitter, which link quality comprises a received signal strength associated with the at least two Rx antennas and a mean bit error probability associated with the at least two Rx antennas.

* * * * *